(12) United States Patent
Howarth

(10) Patent No.: US 8,604,910 B2
(45) Date of Patent: *Dec. 10, 2013

(54) USING SYSLOG AND SNMP FOR SCALABLE MONITORING OF NETWORKED DEVICES

(75) Inventor: Arthur G. Howarth, Orleans (CA)

(73) Assignee: Cisco Technology, Inc., San Jose, CA (US)

(*) Notice: Subject to any disclaimer, the term of this patent is extended or adjusted under 35 U.S.C. 154(b) by 1334 days.

This patent is subject to a terminal disclaimer.

(21) Appl. No.: 11/304,944

(22) Filed: Dec. 13, 2005

(65) Prior Publication Data

US 2006/0091999 A1    May 4, 2006

Related U.S. Application Data

(63) Continuation-in-part of application No. 10/891,238, filed on Jul. 13, 2004.

(51) Int. Cl.
*H04Q 5/22* (2006.01)

(52) U.S. Cl.
USPC .............................. 340/10.1; 705/28; 709/204

(58) Field of Classification Search
None
See application file for complete search history.

(56) References Cited

U.S. PATENT DOCUMENTS

| | | | |
|---|---|---|---|
| 4,625,081 A | 11/1986 | Lotito et al. | |
| 4,688,026 A | 8/1987 | Scribner et al. | |
| 5,339,073 A | 8/1994 | Dodd et al. | |
| 5,646,616 A | 7/1997 | Komatsu | |
| 5,850,187 A | 12/1998 | Carrender et al. | |
| 5,887,176 A | 3/1999 | Griffith et al. | |
| 6,111,517 A | 8/2000 | Atick et al. | |
| 6,115,079 A | 9/2000 | McRae | |
| 6,212,563 B1 | 4/2001 | Beser | |
| 6,272,113 B1 | 8/2001 | McIntyre | |
| 6,282,186 B1 * | 8/2001 | Wood, Jr. | 370/346 |
| 6,300,903 B1 | 10/2001 | Richards et al. | |

(Continued)

FOREIGN PATENT DOCUMENTS

| EP | 1355448 | 10/2003 |
|---|---|---|
| EP | 1376456 | 1/2004 |

(Continued)

OTHER PUBLICATIONS

International Search Report dated Feb. 17, 2006, from related International Application No. PCT/US05/15322, 5 pp. including Notification of Transmittal.

(Continued)

*Primary Examiner* — Luna Champagne
(74) *Attorney, Agent, or Firm* — Novak Druce Connolly Bove + Quigg LLP

(57) ABSTRACT

Methods and devices are provided for determining the status of a networked device. Messages from such devices may include information indicating the health, accuracy and/or reliability of a device and/or of the network that includes the device. Multiple message formats may be supported, e.g., heartbeat only, partial statistics, full statistics, etc. Transmission of such messages may be triggered by the occurrence of various conditions, such as the passage of a predetermined time interval, a predetermined change in one or more criteria, etc. In some implementations, a time-based message throttle establishes a minimum time interval between messages. Messages may be created in a format that is compatible with SNMP. Messages may be transmitted in more than one packet, if necessary. Messages may be sent to one or more devices, e.g., to one or more servers, according to various criteria.

32 Claims, 18 Drawing Sheets

(56) References Cited

U.S. PATENT DOCUMENTS

| | | |
|---|---|---|
| 6,324,575 B1 | 11/2001 | Jain et al. |
| 6,330,597 B2 | 12/2001 | Collin et al. |
| 6,393,458 B1 | 5/2002 | Gigliotti et al. |
| 6,473,858 B1 | 10/2002 | Shimomura et al. |
| 6,539,281 B2 | 3/2003 | Wan et al. |
| 6,553,489 B1 | 4/2003 | Osler et al. |
| 6,677,852 B1* | 1/2004 | Landt .......................... 340/10.1 |
| 6,843,121 B1 | 1/2005 | DeBar et al. |
| 6,912,213 B2 | 6/2005 | Kim |
| 6,931,574 B1 | 8/2005 | Coupal et al. |
| 6,963,282 B1 | 11/2005 | Yeates et al. |
| 6,995,655 B2* | 2/2006 | Ertin et al. .................... 340/10.2 |
| 7,057,511 B2 | 6/2006 | Shanks et al. |
| 7,064,660 B2 | 6/2006 | Perkins et al. |
| 7,075,412 B1 | 7/2006 | Reynolds et al. |
| 7,081,819 B2 | 7/2006 | Martinez de Velasco Cortina et al. |
| 7,103,040 B2 | 9/2006 | Aalbers et al. |
| 7,103,886 B2 | 9/2006 | Haller et al. |
| 7,117,364 B1 | 10/2006 | Hepper et al. |
| 7,129,837 B2 | 10/2006 | Shannon et al. |
| 7,150,017 B1 | 12/2006 | Vogl et al. |
| 7,165,722 B2* | 1/2007 | Shafer et al. .................. 235/385 |
| 7,177,915 B2 | 2/2007 | Kopchik |
| 7,205,897 B2 | 4/2007 | Lin |
| 7,213,768 B2 | 5/2007 | Patel et al. |
| 7,221,660 B1 | 5/2007 | Simonson et al. |
| 7,322,523 B2 | 1/2008 | Howarth et al. |
| 7,325,734 B2 | 2/2008 | Howarth et al. |
| 7,336,175 B2 | 2/2008 | Howarth et al. |
| 7,394,381 B2* | 7/2008 | Hanson et al. ............. 340/572.4 |
| 7,422,152 B2 | 9/2008 | Howarth et al. |
| 7,568,015 B2 | 7/2009 | Wang et al. |
| 7,593,427 B1 | 9/2009 | Wongsonegoro et al. |
| 7,648,070 B2 | 1/2010 | Droms et al. |
| 8,060,623 B2 | 11/2011 | Vogel et al. |
| 8,113,418 B2 | 2/2012 | Howarth et al. |
| 2001/0012292 A1 | 8/2001 | Merrill et al. |
| 2001/0028308 A1 | 10/2001 | De La Huerga |
| 2002/0001307 A1 | 1/2002 | Nguyen et al. |
| 2002/0016739 A1 | 2/2002 | Ogasawara |
| 2002/0046263 A1 | 4/2002 | Camerini et al. |
| 2002/0075805 A1 | 6/2002 | Gupta et al. |
| 2002/0161907 A1 | 10/2002 | Moon |
| 2003/0046339 A1* | 3/2003 | Ip ................................ 709/203 |
| 2003/0065784 A1 | 4/2003 | Herrod |
| 2003/0095032 A1 | 5/2003 | Hoshino et al. |
| 2003/0126248 A1 | 7/2003 | Chambers |
| 2003/0174714 A1 | 9/2003 | Manik et al. |
| 2003/0177374 A1 | 9/2003 | Yung et al. |
| 2003/0226887 A1 | 12/2003 | Komine et al. |
| 2004/0010594 A1 | 1/2004 | Boyd et al. |
| 2004/0021569 A1 | 2/2004 | Lepkofker et al. |
| 2004/0061646 A1 | 4/2004 | Andrews et al. |
| 2004/0064577 A1 | 4/2004 | Dahlin et al. |
| 2004/0069852 A1 | 4/2004 | Seppinen et al. |
| 2004/0073600 A1 | 4/2004 | Elo et al. |
| 2004/0100383 A1* | 5/2004 | Chen et al. .................. 340/572.1 |
| 2004/0108795 A1 | 6/2004 | Meek et al. |
| 2004/0128389 A1 | 7/2004 | Kopchik |
| 2004/0145474 A1 | 7/2004 | Schmidtberg et al. |
| 2004/0257202 A1 | 12/2004 | Coughlin et al. |
| 2004/0259557 A1 | 12/2004 | Bey |
| 2005/0021626 A1 | 1/2005 | Prajapat et al. |
| 2005/0027778 A1 | 2/2005 | Dimitrelis et al. |
| 2005/0080881 A1 | 4/2005 | Voorhees et al. |
| 2005/0088284 A1* | 4/2005 | Zai et al. ...................... 340/10.2 |
| 2005/0093679 A1 | 5/2005 | Zai et al. |
| 2005/0099270 A1 | 5/2005 | Diorio et al. |
| 2005/0102406 A1 | 5/2005 | Moon |
| 2005/0199716 A1 | 9/2005 | Shafer et al. |
| 2005/0209947 A1 | 9/2005 | Shafer |
| 2005/0228887 A1 | 10/2005 | Wang et al. |
| 2005/0252957 A1 | 11/2005 | Howarth et al. |
| 2005/0252970 A1 | 11/2005 | Howarth et al. |
| 2005/0252971 A1 | 11/2005 | Howarth et al. |
| 2005/0253717 A1 | 11/2005 | Howarth et al. |
| 2005/0253718 A1 | 11/2005 | Droms et al. |
| 2005/0253722 A1 | 11/2005 | Droms et al. |
| 2005/0264420 A1 | 12/2005 | Vogel et al. |
| 2006/0005035 A1 | 1/2006 | Coughlin |
| 2006/0010086 A1 | 1/2006 | Klein |
| 2006/0022801 A1 | 2/2006 | Husak et al. |
| 2006/0031374 A1 | 2/2006 | Lu et al. |
| 2006/0033606 A1 | 2/2006 | Howarth et al. |
| 2006/0044111 A1 | 3/2006 | Kollar et al. |
| 2006/0047464 A1 | 3/2006 | Kumar et al. |
| 2006/0053234 A1 | 3/2006 | Kumar et al. |
| 2006/0091999 A1 | 5/2006 | Howarth |
| 2006/0123467 A1 | 6/2006 | Kumar et al. |
| 2006/0132304 A1 | 6/2006 | Cabell |
| 2006/0143318 A1 | 6/2006 | Prajapat et al. |
| 2006/0146879 A1 | 7/2006 | Anthias et al. |
| 2006/0253590 A1 | 11/2006 | Nagy et al. |
| 2006/0266832 A1 | 11/2006 | Howarth et al. |
| 2006/0280181 A1 | 12/2006 | Brailas et al. |
| 2007/0013518 A1 | 1/2007 | Howarth |
| 2007/0027966 A1 | 2/2007 | Singhal et al. |
| 2007/0080784 A1 | 4/2007 | Kim et al. |
| 2007/0109100 A1 | 5/2007 | Jett et al. |
| 2007/0112574 A1 | 5/2007 | Greene |
| 2007/0258048 A1 | 11/2007 | Pitchers |
| 2007/0283001 A1 | 12/2007 | Spiess et al. |
| 2008/0087730 A1 | 4/2008 | Howarth et al. |
| 2008/0104209 A1 | 5/2008 | Singhal et al. |
| 2008/0136599 A1 | 6/2008 | Sugano et al. |
| 2008/0197980 A1 | 8/2008 | Howarth et al. |
| 2009/0049191 A1 | 2/2009 | Tolliver |
| 2011/0004781 A1 | 1/2011 | Howarth |

FOREIGN PATENT DOCUMENTS

| | | |
|---|---|---|
| GB | 2365662 | 2/2002 |
| WO | WO 98-26530 | 6/1998 |
| WO | WO2003-021465 | 3/2003 |
| WO | WO 2004-012424 | 2/2004 |
| WO | WO2005-114604 | 5/2005 |
| WO | 2005-060208 | 6/2005 |
| WO | WO2005-060208 | 6/2005 |
| WO | WO2005-114545 | 12/2005 |
| WO | WO2005-114602 | 12/2005 |
| WO | WO2005-114603 | 12/2005 |
| WO | WO2007-011591 | 1/2007 |
| WO | WO2008-016488 | 2/2008 |

OTHER PUBLICATIONS

Written Opinion of the International Searching Authority dated Feb. 17, 2006, from related International Application No. PCT/US05/15322, 3 pp.

US Office Action mailed Apr. 4, 2007 from (related) U.S. Appl. No. 10/866,285.

US Office Action mailed Jun. 18, 2007 from (related) U.S. Appl. No. 11/010,089.

US Office Action mailed Aug. 9, 2006 from related U.S. Appl. No. 10/866,507.

U.S. Office Action mailed Jun. 26, 2007 from U.S. Appl. No. 11/195,160.

Notice of Allowance and Notice of Allowability, mailed Sep. 10, 2007 from U.S. Appl. No. 10/866,506.

Notice of Allowance and Notice of Allowability, mailed Sep. 28, 2007 from U.S. Appl. No. 10/866,507.

Notice of Allowance and Notice of Allowability, mailed Sep. 10, 2007 from U.S. Appl. No. 10/866,285.

Notice of Allowance and Notice of Allowability, mailed Oct. 11, 2007 from U.S. Appl. No. 11/010,089.

Notice of Allowance and Notice of Allowability, mailed Sep. 19, 2007 from U.S. Appl. No. 11/195,160.

R. Droms, *Dynamic Host Configuration Protocol*, RFC 2131, Mar. 1997, 43 pages.

S. Alexander et al., *DHCP Options and BOOTP Vendor Extensions*, RFC 2132, Mar. 1997, 32 pages.

(56) References Cited

OTHER PUBLICATIONS

G. Stump et al., *The User Class Option for DHCP*, RFC 3004, Nov. 2000, 6 pages.
Y. T'Joens et al., *DHCP Reconfigure Extension*, RFC 3203, Dec. 2001, 6 pages.
M. Patrick, *DHCP Relay Agent Information Option*, RFC 3046, Jan. 2001, 14 pages.
EPCg1, *Frequently Asked Questions*, http://www.epcglobalinc.com/about/faqs.html, printed Mar. 24, 2005, 9 pages.
C. Lonvick, *The BSD Syslog Protocol*, RFC 3164, Aug. 2001, 28 pages.
International Search Report, dated Oct. 13, 2005 from related International Application No. PCT/US05/16484, 6 pp. including Notification of Transmittal.
Written Opinion of the International Searching Authority, dated Oct. 13, 2005 from related International Application No. PCT/US05/16484, 5 pages.
"Simple Network Management Protocol", Internetworking Technologies Handbook, Chapter-56, printed Jul. 14, 2005, 12 pages.
D. Harrington et al, *An architecture for Describing Simple Network Management Protocol (SNMP) Management Frameworks*, RFC 3411, Dec. 2002, 64 pages.
R. Presuhn, Editor, *Version 2 of the Protocol Operations for the Simple Network Management Protocol (SNMP)*, RFC 3416, Dec. 2002, 31 pages.
US Notice of Allowance dated Jun. 1, 2009 issued in U.S. Appl. No. 11/954,721.
US Notice of Allowance dated Feb. 11, 2009 issued in U.S. Appl. No. 11/954,721.
US Office Action dated Aug. 13, 2008 issued in U.S. Appl. No. 11/954,721.
US Notice of Allowance dated Jan. 11, 2008 issued in U.S. Appl. No. 11/010,089.
US Office Action dated May 12, 2008 issued in U.S. Appl. No. 11/104,140.
US Office Action Final dated Oct. 6, 2008 issued in U.S. Appl. No. 11/104,140.
US Examiner Interview Summary dated Jan. 14, 2009 issued in U.S. Appl. No. 11/104,140.
US Office Action dated Mar. 4, 2009 issued in U.S. Appl. No. 11/104,140.
US Office Action (Restriction) dated Apr. 1, 2008 issued in U.S. Appl. No. 11/119,169.
US Office Action dated Aug. 6, 2008 issued in U.S. Appl. No. 11/119,169.
US Notice of Allowance and Examiner's Amendment dated Feb. 11, 2009 issued in U.S. Appl. No. 11/119,169.
US Notice of Allowance dated Apr. 13, 2009 issued in U.S. Appl. No. 11/129,709.
US Notice of Allowance dated Nov. 10, 2008 issued in U.S. Appl. No. 11/129,709.
US Notice of Allowance dated Aug. 8, 2008 issued in U.S. Appl. No. 11/129,709.
US Notice of Allowance dated Mar. 26, 2008 issued in U.S. Appl. No. 11/129,709.
US Office Action dated Nov. 26, 2008 issued in U.S. Appl. No. 11/182,312.
US Office Action (Restriction) dated Jul. 28, 2009 issued in U.S. Appl. No. 11/182,312.
US Examiner's Amendment dated Nov. 7, 2007 issued in U.S. Appl. No. 11/195,160.
US Examiner's Amendment and Supplemental Notice of Allowance dated Oct. 22, 2007 issued in U.S. Appl. No. 11/195,160.
US Supplemental Notice of Allowance dated Oct. 22, 2007 issued in U.S. Appl. No. 11/195,160.
Canadian Examination Report dated Nov. 17, 2008 issued in CA2565099.
Canadian Examination Report dated Feb. 4, 2008 issued in CA2565099.
Chinese Office Action (third) dated Feb. 20, 2009 issued in CN1954327 [CN200580015167.4].
Chinese Office Action (second) dated Aug. 15, 2008 issued in CN1954327 [CN200580015167.4].
Chinese Office Action (first) dated Feb. 29, 2008 issued in CN1954327 [CN200580015167.4].
Canadian Examination Report dated Feb. 1, 2008 issued in CA 2,565,456.
Chinese Office Action (second) dated dated Aug. 15, 2008 issued in CN1954329 [CN200580015169.3].
Chinese Office Action (first) dated dated Feb. 29, 2008 issued in CN1954329 [CN200580015169.3].
Chinese Office Action (second) dated Aug. 15, 2008 issued in CN200580015168.9.
Chinese Office Action (first) dated Feb. 29, 2008 issued in CN200580015168.9.
European Examination Report dated Sep. 18, 2008 issued in EP06739488.
Chinese Office Action dated Jun. 27, 2008 issued in CN200580031604.01.
PCT International Preliminary Examination Report dated Nov. 14, 2006 issued in WO2005114545 [PCT/US2005/016484].
PCT International Search Report dated Nov. 8, 2005 issued in WO2005-114545 [PCT/US2005/016484].
PCT Written Opinion dated Nov. 8, 2005 issued in WO2005114545 [PCT/US2005/016484].
PCT International Preliminary Examination Report dated Nov. 14, 2006 issued in WO2005-114602 [PCT/US2005/015322].
PCT International Search Report dated May 19, 2008 issued in WO2006107613 [PCT/US2007/16321].
PCT International Preliminary Examiniation Report dated Nov. 14, 2006 issued in WO2005-114603 [PCT/US2005/016319].
PCT International Preliminary Examination Report dated Oct. 3, 2007 issued in WO2005114604 [PCT/US2005/016958].
PCT International Search Report dated Sep. 12, 2007 issued in WO2005114604 [PCT/US2005/016958].
PCT Written Opinion dated Sep. 12, 2007 issued in WO2005114604 [PCT/US2005/016958].
PCT International Search Report dated Mar. 6, 2008 issued in WO2007011591 [PCT/US2006/026970].
PCT Written Opinion dated Mar. 6, 2008 issued in WO2007011591 [PCT/US2006/026970].
PCT International Preliminary Examination Report dated Mar. 17, 2009 issued in WO2007011591 [PCT/US2006/026971].
Johnston, M., DHCP Preboot Execution Environment (PXE) Options draft-ietf-dhc-pxe-options-01.txt, Internet-Draft, Jan. 21, 2005, 7 pages.
Johnson, R., *TFTP Server Address DHCP Option draft-raj-dhc-tftp-addr-option-00.txt*, Internet-Draft, Feb. 6, 2005, 7 pages.
Littlefield, J., *Vendor-Identifying Vendor Options for Dynamic Host Configuration Protocol version 4 (DPHCPv4)*, RFC 3925, Oct. 2004, 9 pages.
Schulzrinne, H., Dynamic Host Configuration Protocol (DHCPv4 and DHCPv6) Option for Civic Addresses Configuration Information, draft-ietf-geopriv-dhcp-civil-05, Internet-Draft, Feb. 19, 2004.
Polk, J., et al., Dynamic Host Configuration Protocol Option for Coordinate-based Location Configuration Information, RFC 3825, Jul. 2004, 15 pages.
AeroScout Visibility System: Bridging the Gap Between Wi-Fi, Active RFID and Telemetry, AeroScout Enterprise Visibility Solutions, http://www.aeroscout.com/content.asp?page=System Overview, printed Apr. 16, 2005, 3 pages.
WhereNet, Products, http://wherenet.com/products_main.html, printed Apr. 16, 2005, 2 pages.
EPCglobal Tag Data Standards Version 1.1 Rev.1.24, EPCglobal, Standard Specification, Apr. 1, 2004, 78 pages.
Global Location No. (GLN) Implementation Guide, Uniform Code Council, Inc., May 2002, 13 pages.
The Global Language of Business, retrieved from the internet: http://www.ean-int.org/locations.html, [retrieved Mar. 24, 2005], 5 pages.

(56) References Cited

OTHER PUBLICATIONS

"Cisco Application-Oriented Networking: A Network-Based Intelligent Message Routing System", http://www.cisco.com/en/US/products/ps6438/products_data_sheet0900aecd802c1f9c.html Data Sheet, Cisco Systems, Inc., Jul. 13, 2005, pp. 1-7.
"Cisco Catalyst 6500 Series Application-Oriented Networking Module", http://www.cisco.com/en/US/products/ps6438/products_data_sheet0900aecd802c1fe9.html Data Sheet, Cisco Systems, Inc. Jul. 13, 2005, pp. 1-3.
"Cisco Application-Oriented Networking—A Network Embedded Intelligent Message Routing System", http://www.cisco.com/en/US/products/ps6438/prod_bulletin0900aecd802c201b.html Product Bulletin No. 2886, Cisco Systems, Inc. Jul. 13, 2005, pp. 1-3.
"Cisco Catalyst 6500 Series Application-Oriented Networking Module: Large Photo", Photo, Retrieved from the internet: http://www.cisco.com/en/US/products/ps6448/prod_view_selector.html [Retrieved Jul. 13, 2005], Cisco Systems, Inc. 1 page.
"The EPCglobal Architecture Framework" EPCglobal Final Version of Jul. 1, 2005, pp. 1-53.
Girardot, Marc and Sundaresan, Neel, "Millau: an encoding format for efficient representation and exchange of XML over the web" [Retrieved Jan. 31, 2005]. Retrieved from the internet: http:www9.org/w9cdrom/154/154.html 25 pages.
Fujitsu Limited, et al., "Web Services Reliability (WS-Reliability) Ver1.0", Jan. 8, 2003. pp. 1-45.
Biloruset, Ruslan et al., "Web Services Reliable Messaging Protocol (WS-ReliableMessaging)", Mar. 2004, pp. 1-40.
Mockapetris, P., "Domain Names—Concepts and Facilities", RFC 1034, Nov. 1987, 43 pages.
Mockapetris, P., "Domain Names—Implementation and Specification", RFC 1035, 55 pages.
International Search Report dated Jul. 13, 2006, from (related) International Application No. PCT/US05/16319, 5 pp. including Notification of Transmittal.
Written Opinion of the International Searching Authority dated Jul. 13, 2006, from (related) International Application No. PCT/US05/16319, 5 pp.
US Office Action mailed Oct. 6, 2006 from (related) U.S. Appl. No. 10/866,506.
US Office Action mailed Oct. 6, 2006 from (related) U.S. Appl. No. 10/866,285.
US Office Action mailed Nov. 13, 2006 from (related)U.S. Appl. No. 11/073,245, 12 pp.
US Office Action mailed Jan. 18, 2007 from (related) U.S. Appl. No. 10/866,507, 4 pp.
US Office Action mailed Mar. 22, 2007 from (related) U.S. Appl. No. 10/866,506, 7 pp.
US Notice of Allowance dated Sep. 22, 2009 issued in U.S. Appl. No. 11/954,721.
US Office Action dated Jun. 10, 2010 issued in U.S. Appl. No. 10/891,238.
US Office Action Final dated Feb. 4, 2010 issued in U.S. Appl. No. 10/891,238.
US Office Action dated Jul. 31, 2009 issued in U.S. Appl. No. 10/891,238.
US Office Action dated Aug. 4, 2009 issued in U.S. Appl. No. 11/496,779.
US Office Action Final dated Jan. 26, 2010 issued in U.S. Appl. No. 11/496,779.
US Final Office Action dated Sep. 30, 2009 issued in U.S. Appl. No. 11/104,140.
US Notice of Allowance dated Apr. 19, 2010 issued in U.S. Appl. No. 11/119,169.
US Notice of Allowance dated Dec. 15, 2009 issued in U.S. Appl. No. 11/119,169.
US Notice of Allowance dated Jun. 4, 2009 issued in U.S. Appl. No. 11/119,169.
US Notice of Allowance dated Aug. 31, 2009 issued in U.S. Appl. No. 11/129,709.
US Office Notice of Allowance dated May 11, 2010 issued in U.S. Appl. No. 11/182,312.
US Office Action dated Jun. 10, 2009 issued in U.S. Appl. No. 11/182,312.
US Office Action dated Apr. 28, 2010 issued in U.S. Appl. No. 11/965,693.
US Office Final Action dated Nov. 2, 2009 issued in U.S. Appl. No. 11/965,693.
US Office Action dated Oct. 2, 2009 issued in U.S. Appl. No. 11/346,739.
U.S. Office Action Final dated Apr. 14, 2010 issued in U.S. Appl. No. 11/346,739.
EPCglobal EPC Generation 1 Tag Date Standards Version 1.1 Rev. 1.27; http://www.epcglobalinc.org/standards/tds/tds_1_lrev_1_27-standard-2005051.pdf; 87 pgs (submitted in 3 parts).
RFC-2236 Internet Group Management Protocol, v.1, Nov. 1997, retrieved from the Internet on Oct. 22, 2007 and Aug. 5, 2010 at http://www.faqs.org/rfcs/rfc2236.html, 19pgs.
Abbott, et al., "Alternatives for Providing Routing and Location Information to Support Emergency Calling from IP Enterprises", NENA Technical Information Document; Oct. 3, 2003, XP002323684, 16 pgs.
Canadian Examination Report dated Oct. 14, 2010, from CA Appl. No. 2565099.
EP Supplementary European Search Report dated Aug. 9, 2010, in Appl. No. EP05750091.0.
EP Office Action dated Oct. 8, 2010, in Appl. No. EP05750091.0.
EP Supplementary European Search Report dated Aug. 6, 2010, in Appl. No. EP05743006.8.
EP Office Action dated Oct. 18, 2010, in Appl. No. EP05743006.8.
EP Supplementary European Search Report dated Aug. 6, 2010, in Appl. No. EP05747434.8.
EP Office Action dated Oct. 26, 2010, in Appl. No. EP05747434.8.
EP Supplementary European Search Report dated Aug. 6, 2010, in Appl. No. EP05753531.2.
EP Office Action dated Oct. 8, 2010, in Appl. No. EP05753531.2.
US Final Office Action dated Nov. 17, 2010, from U.S. Appl. No. 10/891,238.
US Non-Final Office Action dated Oct. 26, 2010, from U.S. Appl. No. 12/082,635.
US Non-Final Office Action dated Nov. 22, 2010, from U.S. Appl. No. 11/496,779.
US Non-Final Office Action dated Aug. 23, 2010, from U.S. Appl. No. 11/104,140.
US Office Notice of Allowance dated Sep. 1, 2010, from U.S. Appl. No. 11/182,312.
US Office Action dated Nov. 16, 2010, from U.S. Appl. No. 11/965,693.
US Office Action dated Apr. 15, 2011, from U.S. Appl. No. 10/891,238.
US Non-Final Office Action dated Apr. 4, 2011, from U.S. Appl. No. 12/082,635.
US Notice of Allowance dated Oct. 11, 2011, from U.S. Appl. No. 11/496,779.
Canadian Office Action dated Jul. 5, 2011, from CA Appl. No. 2,565,451.
US Final Office Action dated Sep. 29, 2011, from U.S. Appl. No. 10/891,238.
US Non-Final Office Action dated Sep. 29, 2011, from U.S. Appl. No. 12/082,635.
US Non-Final Office Action dated May 12, 2011, from U.S. Appl. No. 11/496,779.
US Notice of Allowance dated Aug. 11, 2011 from U.S. Appl. No. 11/104,140.

\* cited by examiner

DNS Table
A.Door235.W14.RFID.cisco.com, 1.1.1.1
 TXT mw-srv-1.W14.RFID.cisco.com
B.Door235.W14.RFID.cisco.com, 1.1.1.2
 TXT mw-srv-2.W14.RFID.cisco.com
C.Door235.W14.RFID.cisco.com, 1.1.1.3
 TXT mw-srv-1.W14.RFID.cisco.com
mw-srv-1.W14.RFID.cisco.com, 1.1.2.1
mw-srv-2.W14.RFID.cisco.com, 1.1.2.2
W14.RFID.cisco.com

*Fig. 3F* ized operating system, e.g., of the manufacturer of the microprocessor(s) used in the RFID device.

RFID devices do not currently achieve reliability levels required of customers. Moreover, many RFID devices are deployed in a hostile industrial environment (such as a warehouse or factory) by relatively unskilled "IT" personnel. RFID devices may be used intermittently or infrequently. However, when an RFID device is needed it must perform immediately or significant delays may ensue. These delays may affect an entire supply chain and could result in significant costs.

One established method of determining the status of networked devices is actively polling each device. In part because of the bandwidth consumed by the polling process, this is not a desirable method for networks involving large numbers of devices.

The proposals currently being considered for implementation by EPCGlobal, the de facto standards body for RFID networking, call for the use of the Simple Network Management Protocol ("SNMP") for device management. SNMP allows for "trap" generation when an exceptional situation occurs. However, SNMP traps are not intended for routine status reporting. Such use would be considered an abuse of SNMP and would not be well accepted by other standards bodies.

Therefore, it would be desirable to provide methods for ensuring that specific RFID devices, or similarly unsophisticated devices in a network, are healthy and operational. It would also be desirable to detect, diagnose and correct incipient device problems before such problems reach critical levels and/or require device replacement. Moreover, it would be desirable to implement such methods without having to actively "poll" such devices.

USING SYSLOG AND SNMP FOR SCALABLE MONITORING OF NETWORKED DEVICES

CROSS-REFERENCE TO RELATED APPLICATION

This application is a continuation-in-part of U.S. patent application Ser. No. 10/891,238, entitled "Methods and Apparatus for Determining the Status of a Device" and filed on Jun. 13, 2004, which is hereby incorporated by reference in its entirety and for all purposes.

BACKGROUND OF THE INVENTION

1. Field of the Invention

The present invention relates methods and devices for monitoring the status of networked devices. More particularly, the present invention relates to monitoring the status of relatively unsophisticated devices, such as radio frequency identification ("RFID") devices, in a network.

2. Description of the Related Art

"Smart labels," generally implemented by RFID tags, have been developed in an effort to address the shortcomings of bar codes and add greater functionality. RFID tags have been used to keep track of items such as airline baggage, items of clothing in a retail environment, cows and highway tolls. As shown in FIG. 1, an RFID tag 100 includes microprocessor 105 and antenna 110. In this example, RFID tag 100 is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

RFID tags use the Electronic Product Code ("EPC" or "ePC") format for encoding information. An EPC code includes variable length bits of information (common formats are 64, 96 and 128 bits), which allows for identification of individual products as well as associated information. As shown in FIG. 1, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

In theory, RFID tags and associated RFID devices (such as RFID readers and printers) could form part of a network for tracking a product (or a group of products) and its history. However, various difficulties have prevented this theory from being realized. One problem that has required considerable time and energy from RF engineers is the development of lower-cost RFID tags with acceptable performance levels.

In part because of the significant efforts that have been expended in solving the foregoing problems, prior art systems and methods for networking RFID devices are rather primitive. RFID devices have only recently been deployed with network interfaces. Prior art RFID devices and systems are not suitable for large-scale deployment of networks of RFID devices.

Conventional RFID devices also have a small amount of available memory. A typical RFID device may have approximately 0.5 Mb of flash memory and a total of 1 Mb of overall memory. The small memories of RFID devices place restrictions on the range of possible solutions to the problems noted herein. In addition, an RFID device typically uses a propri-

SUMMARY OF THE INVENTION

Methods and devices are provided for determining the status of a networked device, e.g., a networked RFID device. In some embodiments of the invention, one or more customized packets are used to transmit a message from networked devices to a server. The message may include information indicating the health, accuracy and/or reliability of the device and/or of the network that includes the device. In some implementations, multiple message formats are supported, e.g., heartbeat only, partial statistics, full statistics, etc.

Transmission of such messages may be triggered by the occurrence of various events, such as the passage of a predetermined time interval, changes in one or more conditions, etc. In some implementations, a time-based message throttle establishes a minimum time interval between messages. Some preferred implementations provide messages that are created in a format that is compatible with SNMP. Messages may be transmitted in more than one packet, if necessary. Moreover, messages may be sent to one or more devices, e.g., to one or more servers, according to various criteria.

Some aspects of the invention provide a method for determining the status of a device. The method includes these steps: (1) instructing each of a plurality of radio frequency identification ("RFID") devices to transmit a message upon the occurrence of at least a first condition, the message comprising an Electronic Product Code ("EPC") and a time stamp of a transmitting RFID device; (2) receiving messages transmitted from the RFID devices; and (3) processing the messages according to a first rule set.

The first condition may be, for example, a predetermined change of at least one criterion and/or the passage of a first time interval. Each of the plurality of RFID devices may be configured with a time-based message throttle that sets a minimum time interval for message transmissions from the RFID device.

The messages may be in one of a plurality of predetermined message formats. The message formats may be, for example, a heartbeat format, a status message format, a partial statistics format and a full statistics format. The message can be formatted in a manner consistent with the Simple Network Management Protocol.

The status information included in a message may be device status change information. A message may comprise a single packet or a plurality of packets. The message may also include authentication information. The method may include validating the message according to the authentication information.

Each of the plurality of RFID devices may be configured to transmit a message to one (or more) of a plurality of servers or other devices. For example, the devices may be configured to transmit messages to one or more servers according to the application of a second rule set.

The processing step may include determining that a message indicates a potentially abnormal condition and routing the message to a second destination for diagnosis of the potentially abnormal condition. The method may also include the step of instructing the RFID device that transmitted the message to transmit subsequent messages to the second destination.

A message may include one or more of the following: information regarding utilization of the transmitting RFID device; information regarding a radio frequency interface of the transmitting RFID device; information specified by a vendor of the transmitting RFID device; information regarding a local area network that includes the transmitting RFID device; and information regarding Internet Protocol packet statistics.

Alternative implementations of the invention provide a computer program embodied in a machine-readable medium. The computer program includes instructions for controlling at least one device in a network to perform the following steps: (1) instructing each of a plurality of RFID devices to transmit a message upon the occurrence of at least a first condition, the first condition comprising a predetermined minimum change of at least one criterion, the message comprising an EPC and a time stamp of a transmitting RFID device; (2) receive messages transmitted from the RFID devices; and (3) process the messages according to a first rule set.

Some embodiments of the invention provide an RFID network that includes a plurality of RFID devices and a first server configured to receive messages transmitted from the RFID devices and process the messages according to a first rule set. At least one component of the network is configured for instructing each of the plurality of RFID devices to transmit a message to a first server upon the occurrence of at least a first condition. The message preferably includes an EPC, a time stamp of a transmitting RFID device and device status change information.

The first server may be further configured to determine whether a message indicates a potentially abnormal condition. The RFID network may include a second server. The first server may be further configured to route a message indicating a potentially abnormal condition to the second server. The second server may be configured to evaluate potentially abnormal conditions according to a second rule set.

Other embodiments of the invention provide a network device that includes a plurality of interfaces configured for communication with a plurality of RFID devices. The RFID devices can be configured to transmit a message upon the occurrence of at least a first condition. The message may include an EPC, a time stamp of a transmitting RFID device, version information and device status change information. The message can be formatted in conformity with the Simple Network Management Protocol.

At least one logic device in the network may be configured to perform the following steps: determine a message format of a message from an RFID device; parse the message according to the determined message format; and determine whether the message includes sufficient information to determine a reason for the occurrence of the first condition. The logic device may be further configured to instruct the RFID device to provide additional information when the logic device determines that the message does not include sufficient information to determine a reason for the occurrence of the first condition. The logic device can also be configured to instruct the RFID device to provide the additional information to another network device.

BRIEF DESCRIPTION OF THE DRAWINGS

FIGS. 3C-3F are simplified DNS tables that correspond with various stages of methods 300 and 305.

DETAILED DESCRIPTION OF THE INVENTION

Figure 1:
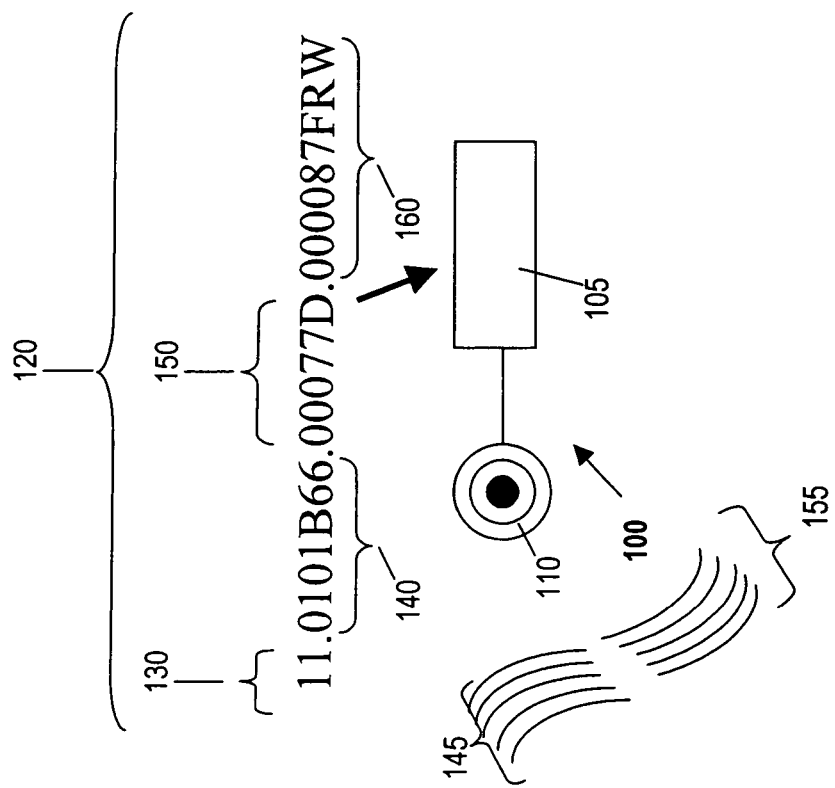
FIG. 1 is a diagram illustrating an RFID tag.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The present invention involves the management of networked devices, including not only the end devices (such as sensors, industrial devices and/or RFID devices) but also the switches, middleware servers, etc., that are in communication with such end devices. Although the present invention will be described primarily with reference to RFID networks, many aspects of the present invention can be applied to devices, including wireless and wired devices, in other types of networks. For example, the present invention may also be used for managing networked manufacturing devices, networked sensor devices, IPphones, portable digital assistants and related network devices, such as servers and switches.

The following U.S. Patent Applications, all of which are hereby incorporated by reference for all purposes, describe relevant provisioning methods and devices: U.S. patent application Ser. No. 10/866,506, entitled "Methods and Devices for Uniquely Provisioning RFID Devices" and filed on Jun. 9, 2004; U.S. patent application Ser. No. 10/866,507, entitled "Methods and Devices for Locating and Uniquely Provisioning RFID Devices" and filed on Jun. 9, 2004; U.S. patent application Ser. No. 10/866,285, entitled "Methods and Devices for Assigning RFID Device Personality" and filed on Jun. 9, 2004; U.S. patent application Ser. No. 10/891,238, entitled "Methods and Devices for Determining the Status of a Device" and filed on Jul. 13, 2004; U.S. patent application Ser. No. 10/876,410, entitled "System and Method for Automatically Configuring Switch Ports with Appropriate Features" and filed Jul. 21, 2004; U.S. patent application Ser. No. 11/010,089, entitled "Methods and Devices for Providing Scalable RFID Networks" and filed on Dec. 9, 2004; U.S. patent application Ser. No. 11/104,140, entitled "Automated Configuration of Network Device Ports" and filed on Apr. 11, 2005; U.S. patent application Ser. No. 11/119,169 entitled "Locating and Provisioning Devices in a Network" and filed on Apr. 29, 2005; U.S. patent application Ser. No. 11/129,709, entitled "Locating, Provisioning and Identifying Devices in a Network" and filed on May 12, 2005, and U.S. patent application Ser. No. 11/182,312, entitled "Provisioning and Redundancy For RFID Middleware Servers" and filed on Jul. 14, 2005 (collectively, the "Cisco RFID Applications").

However, the present invention is not limited to implementations that involve provisioning as taught in the Cisco RFID Applications. For example, a "manual" technique for device provisioning may be used, e.g., wherein an operator interacts with a graphical user interface, completes a form, etc.

Similarly, although much of the discussion herein applies to implementations using the DHCP protocol, the present invention is not protocol-specific and may be used, for example, in implementations using UPnP, 802.1ab or similar discovery protocols. Likewise, while the implementations described herein refer to exemplary DHCP Options, other DHCP Options and the DHCP header may advantageously be used to implement the present invention.

Moreover, although much of the discussion herein applies to implementations using customized packets that are generally within the syslog protocol (as described in RFC 3164, which is hereby incorporated by reference in its entirety) and/or SNMP (e.g., as described in RFC 3416 and the other documents referenced therein, including but not limited to RFCs 1157, 2578, 2579, 2580, 3410, 3411, 3412, 3413, 3414, 3415 and 3417, all of which are hereby incorporated by reference in their entirety), the invention need not be implemented according to either protocol.

Methods and devices are provided herein for determining the status of a networked device, e.g., a networked RFID device. The status of such a device may be determined with reference to messages that are triggered by the occurrence of one or more events. The messages may include information indicating the health, accuracy and/or reliability of the device and/or of the network that includes the device. In some implementations, multiple message formats are supported, e.g., heartbeat only, partial statistics, full statistics, etc.

One event that can be used to trigger the generation of such messages is the passage of a predetermined time interval. However, in some preferred implementations, a time-based message throttle establishes a minimum time interval between messages. Such implementations will be useful in preventing the network from becoming overloaded with messages that are being transmitted too frequently, e.g., in response to a "man-in-the middle" attack by a hacker. Alternatively, or additionally, a message may be generated when one or more conditions have reached predetermined levels or have changed by more than a predetermined amount.

Messages may be transmitted in more than one packet, if necessary. Moreover, messages may be sent to one or more devices, e.g., to one or more servers, according to various criteria. Some such implementations provide a plurality of servers, each of which has a different role in diagnosing and/or responding to messages, as will be described in more detail below.

In some embodiments of the invention, a customized packet generally within the syslog protocol is used to transmit a "heartbeat" from each of a plurality of networked devices to a syslog server. In order to overcome the problems noted above, the heartbeat includes identification information regarding the device, e.g., the unique electronic product code ("EPC") of the device. The packet preferably includes other identification and/or authentication information, such as a shared secret and time data, which may be hashed with the identification information. The heartbeat may include information indicating the health, accuracy and/or reliability of the device and/or of the network that includes the device.

Figure 6:
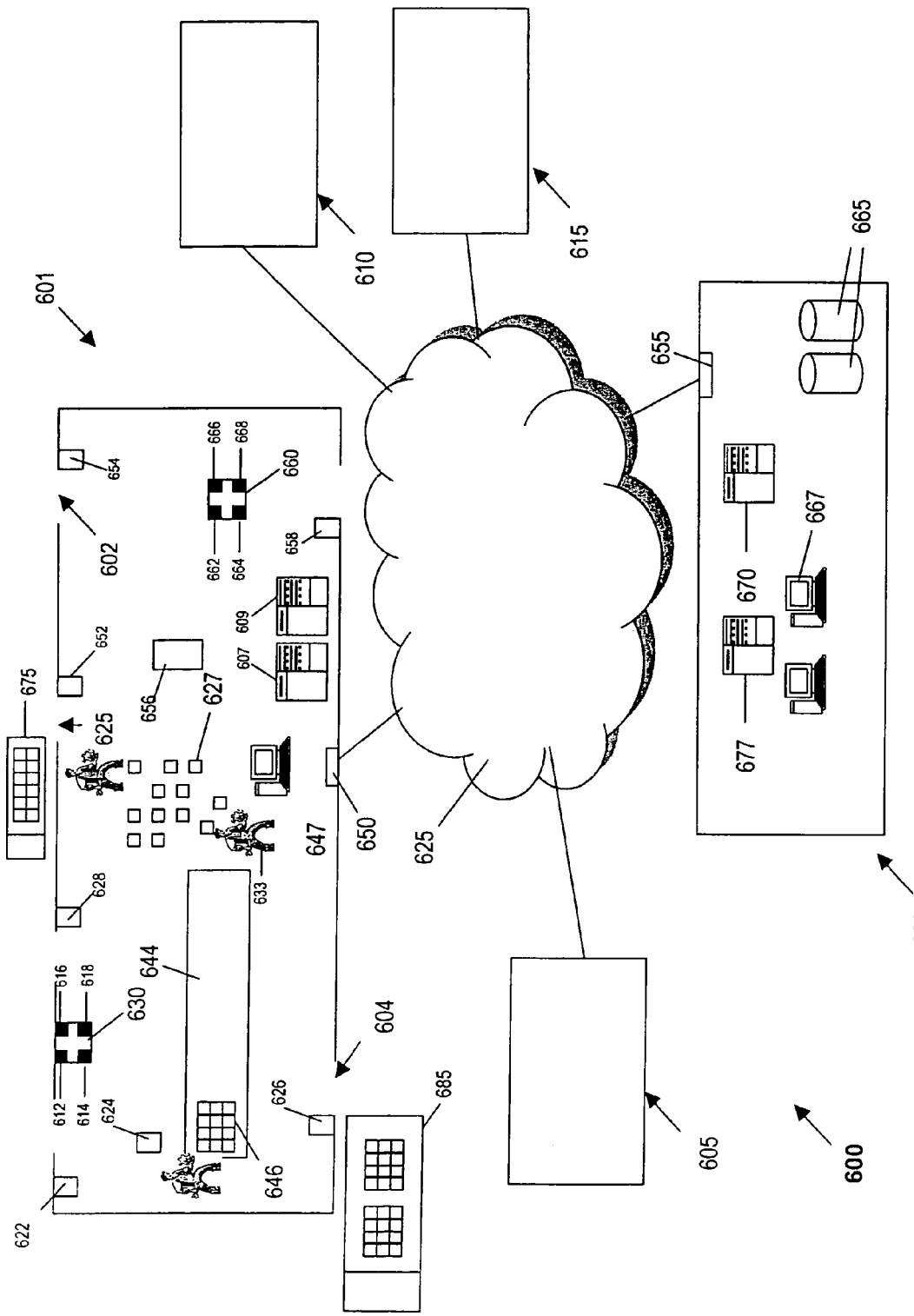
FIG. 6 illustrates another exemplary RFID network according to the present invention.

Some aspects of the invention use a combination of EPC code information and modified versions of existing networking standards for determining the status of devices, such as RFID readers and RFID printers, that are located in a network. Examples of such networks are depicted in FIGS. 2 and 6.

Figure 2:
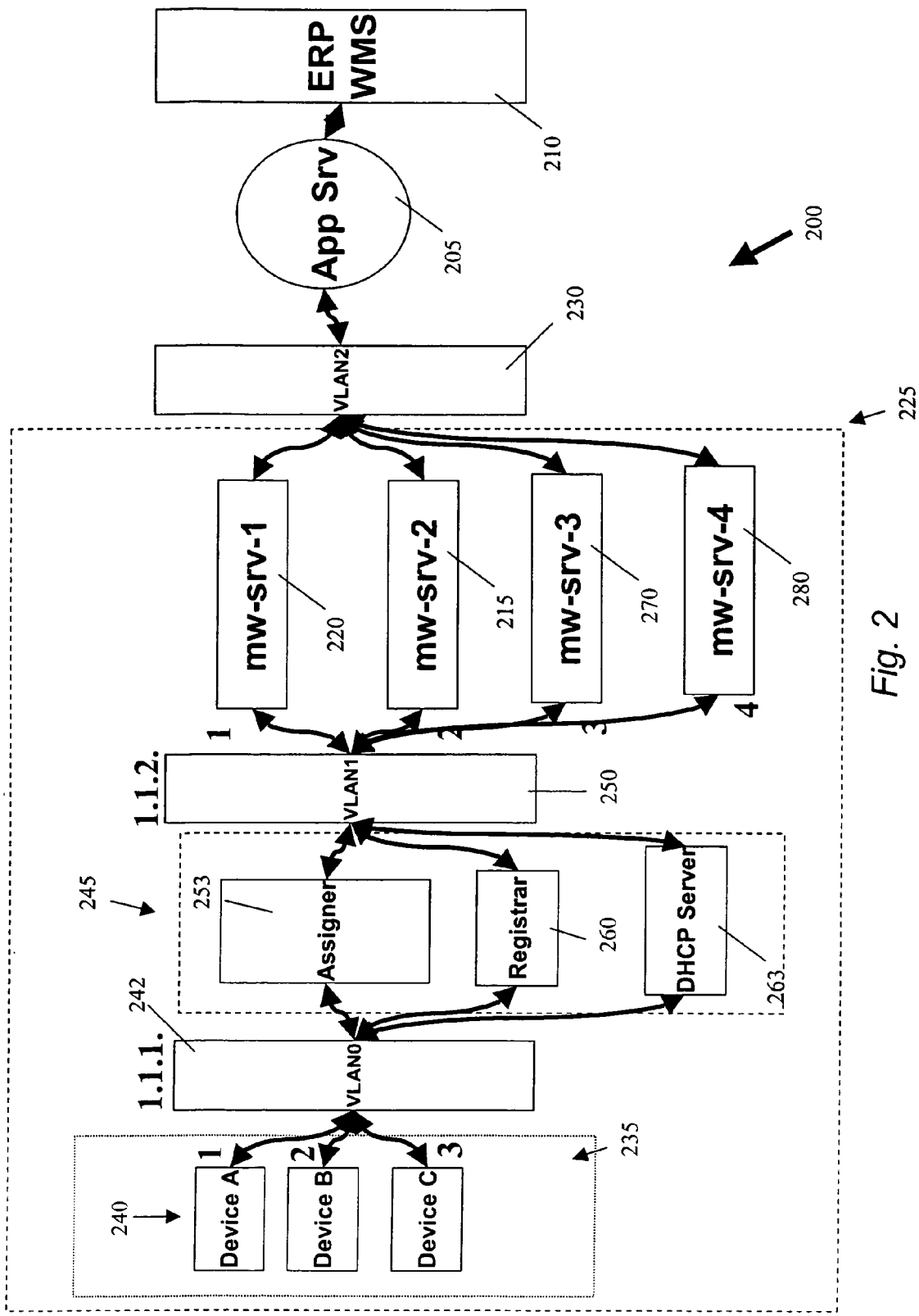
FIG. 2 illustrates an exemplary RFID network according to the present invention.

FIG. 2 illustrates a portion of a simplified RFID network 200 that will be used to describe some implementations of the invention. The details of network 200 are purely illustrative. Application server 205 operates according to instructions from application software 210 that resides in a memory device of, or accessible to, application server 205. Application server 205 is in communication with middleware servers 215 and 220 of site 225, via a virtual local area network ("VLAN") 230 in this example. In this example, at least one of middleware servers 270 and 280 is a standby middleware server.

Site 225, which is "Warehouse 14" in this example, includes numerous locations at which RFID devices are deployed. One such location is door 235, where a plurality of RFID devices 240 are positioned.

RFID devices 240 are in communication with metaserver 245 via VLAN 242. A metaserver will sometimes be referred to herein as a "central server" or the like. As will be discussed in more detail below, in some preferred implementations metaserver 245 includes servers and associated devices that provide various functions, including those of DHCP server 263, assigner 253 and registrar 253. Accordingly, some of the functionality provided by the registrar and assigner as described in the Cisco RFID Applications will be performed by metaserver 245. In some implementations, metaserver 245 is a single device and in other implementations metaserver 245 is an association of separate physical devices. Metaserver 245 may also include a load balancer. Middleware servers 215, 220, 270 and 280 can communicate with metaserver 245 and registrar 260 via VLAN 250.

Figure 3A:
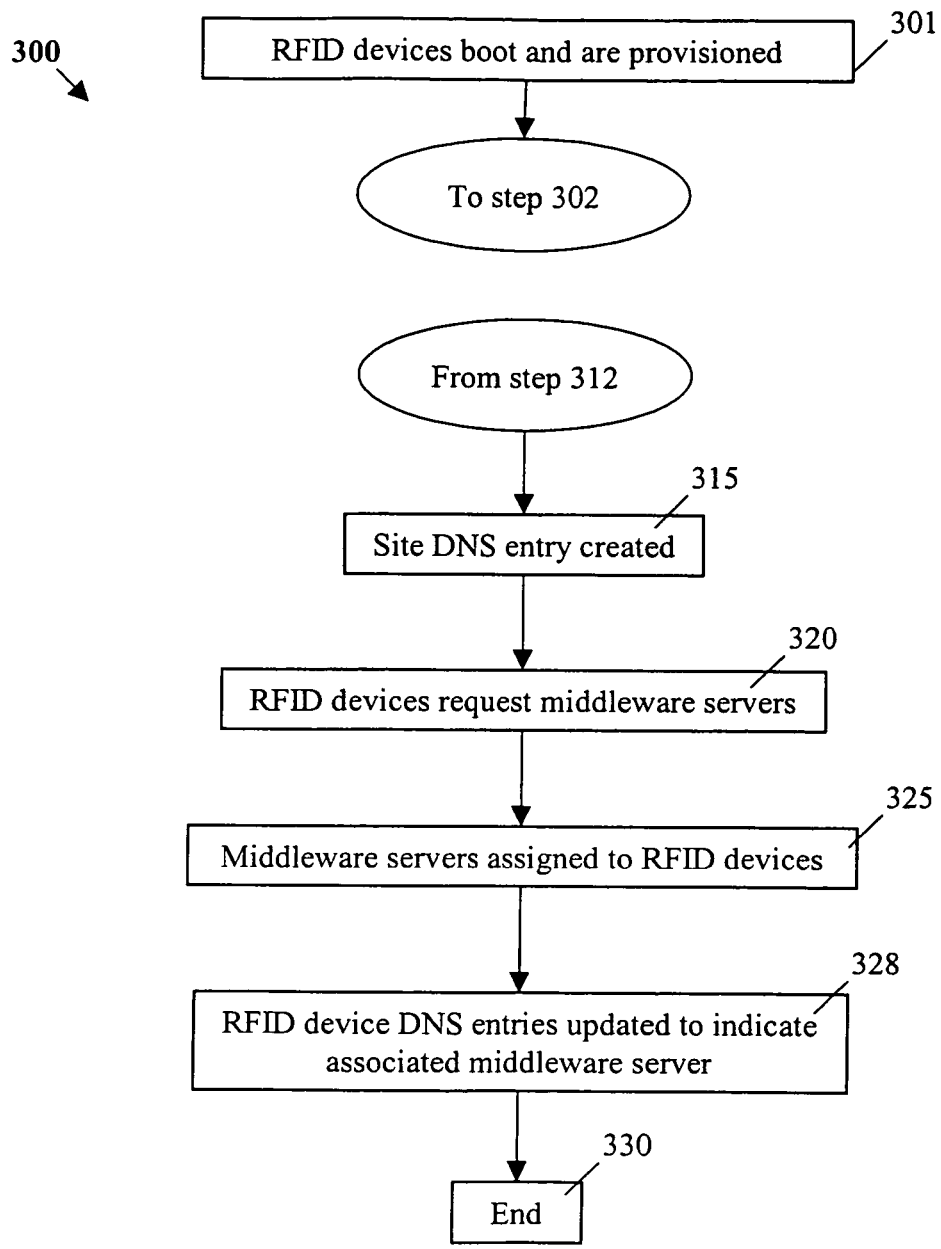
FIGS. 3A and 3B are flow charts that outline methods 300 and 305 of the present invention.

FIG. 3A is a flow chart that provides an overview of method 300 according to the present invention. Those of skill in the art will appreciate that the steps of the methods discussed herein, including method 300, need not be performed (and in some implementations are not performed) in the order shown. Moreover, some implementations of the methods discussed herein may include more or fewer steps than those shown, e.g., in FIG. 3A.

In step 301, RFID devices in a network boot up and are provisioned. The functions a device performs, as well as the unique settings to perform those functions, will be referred to herein as the device "personality." As used herein, "provisioning" a device can include, but is not limited to, providing network configuration, providing personality configuration, incorporating the device into a network database and enabling the device with software. The RFID devices may be dynamically provisioned, for example, according to the methods described in the Cross-Referenced Applications. As described in the Cross-Referenced Applications, the RFID devices can be provided with the network address of DHCP server (e.g., DHCP server 263 of metaserver 245) and instructions for sending a request for a middleware server to the DHCP server.

The DHCP protocol is used in some preferred implementations of the present invention because it offers various convenient features. For example, the DHCP protocol allows pools or "scopes" of TCP/IP addresses to be defined. A DHCP server can temporarily allocate or "lease" these TCP/IP addresses to host devices. An IP address that is not used for the duration of the lease is returned to the pool of unallocated IP addresses. In addition, the DHCP server will provide all related configuration settings, such as the default router, Domain Name Service ("DNS") servers, subnet mask, etc., that are required for the proper functioning of TCP/IP.

For implementations using the DHCP protocol, DHCP Options may be used to pass provisioning information. The DHCP protocol is defined in RFC 2131 and DHCP Options are set forth in, for example, RFCs 2132, 3004 and 3046. RFCs 2131, 2132, 3004 and 3046 are hereby incorporated by reference for all purposes. In some preferred implementations, an EPC corresponding to an RFID device is put inside a DHCP request sent from the RFID device to a DHCP server. The EPC uniquely identifies the RFID device.

Some implementations employ Domain Name Service ("DNS") and dynamic DNS ("DDNS") to allow yet easier identification of RFID devices. RFC 1034 and RFC 1035 are hereby incorporated by reference and for all purposes.

Figure 3B:
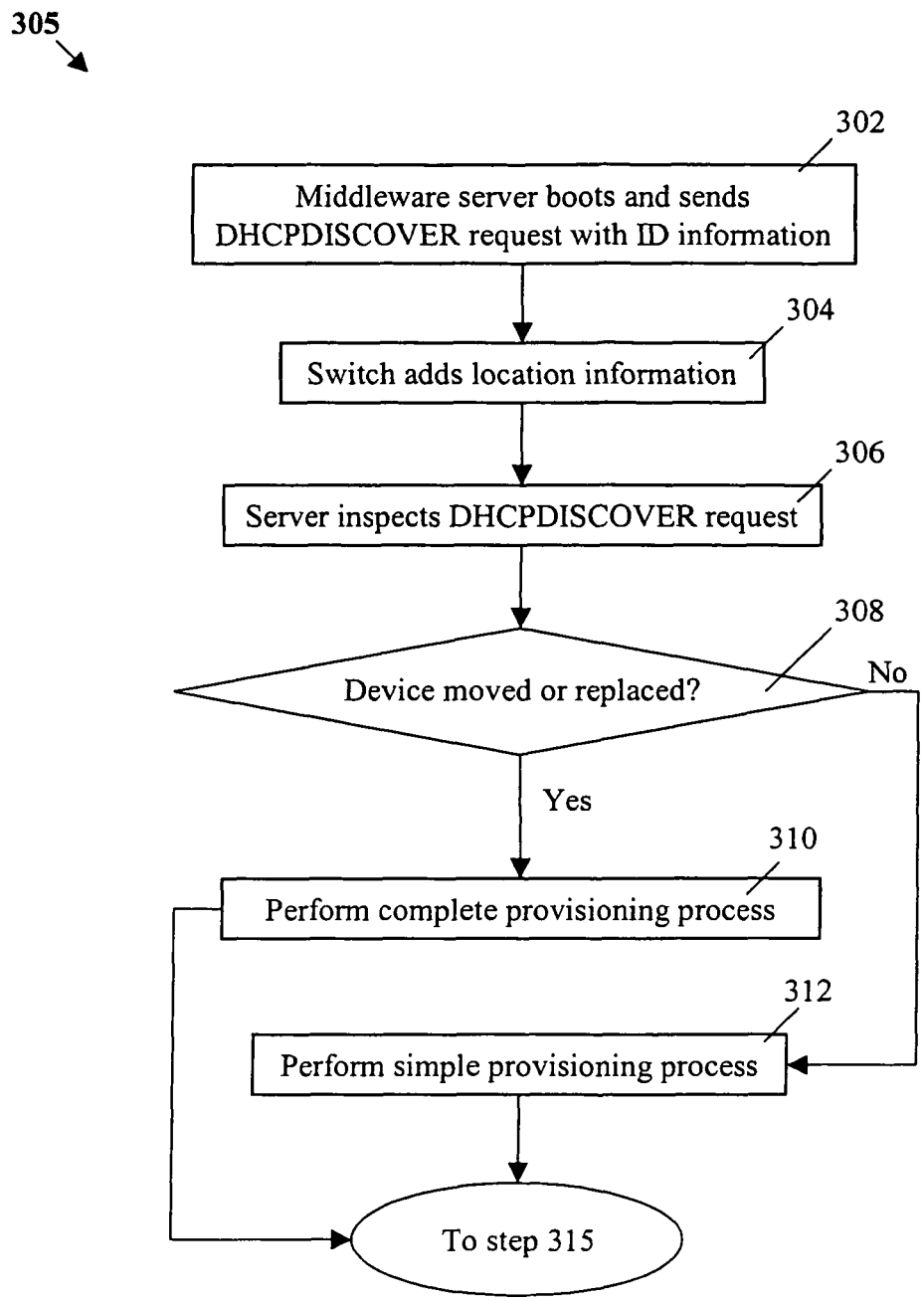
Figure 3C:
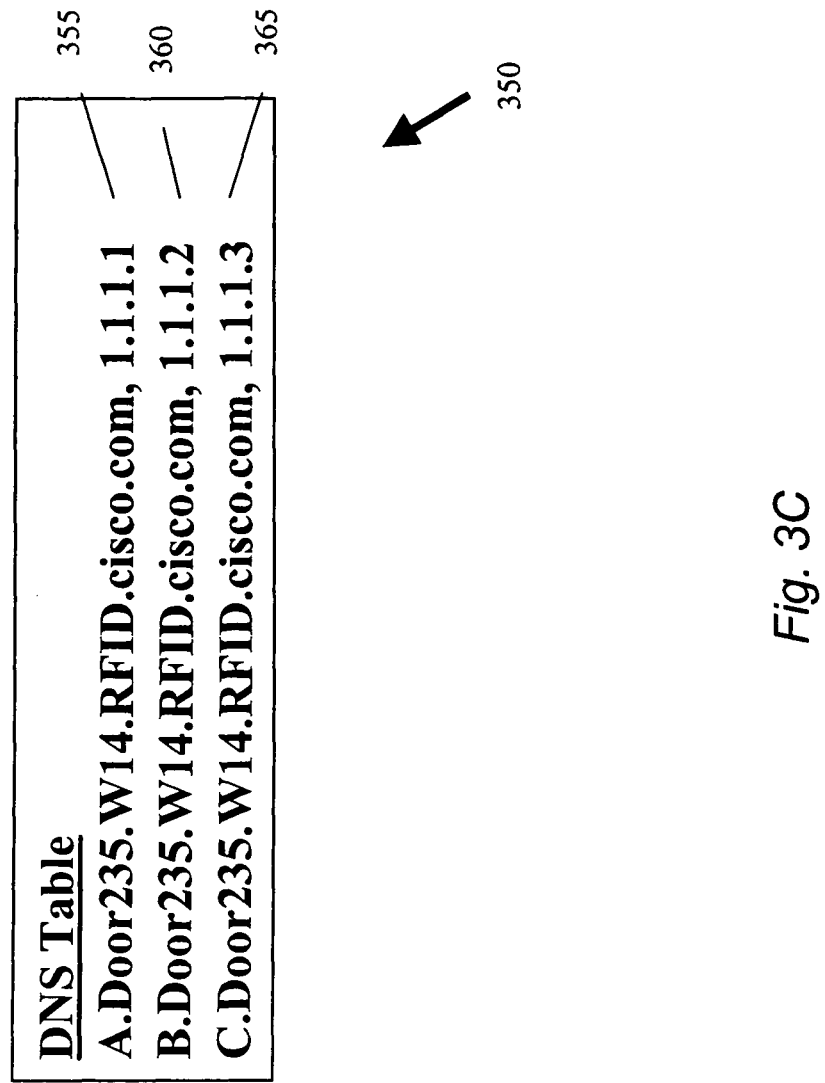

FIG. 3C illustrates one format for DNS entries in a DNS table 350 for RFID devices 240. In this example, DNS Table 350 is stored in 260, but DNS Table 350 could be stored elsewhere in network 200. In DNS table 350, the DNS entries have the following format:

<Device>.<Location>.<Site>.RFID.<Domain>

Accordingly, entry 355 for RFID device A of FIG. 2 includes domain name "A.Door235.W14.RFID.cisco.com" and the associated IP address. Corresponding entries 360 and 365 are formed for RFID devices B and C. One of skill in the art will readily understand that this format is merely one example and that many other suitable formats could be used for this purpose.

Referring to FIG. 3B, in process 305 middleware servers in the network boot up and are provisioned. Process 305 is an automated process; a manual process is described elsewhere herein.

In steps 302 and 304, a middleware server (e.g., middleware server 220 of FIG. 2) initializes and transmits a DHCP-DISCOVER request to a DHCP server (here, DHCP server 263 of metaserver 245) that includes ID information and location information. The ID information and location information may be included in any manner described in the Cross-Referenced Applications with regard to the provisioning of RFID devices. In this example, the ID information includes an EPC code for the middleware server in Option 61 of the DHCPDISCOVER request. However, the ID information could include other types of ID information, such as MAC address information.

Similarly, the location information could take various forms and could be included in the DHCPDISCOVER request in various ways, e.g., including the location information in one or more DHCP Options and/or the header. Here, a switch in communication with the middleware server inserts location information (in the form of switch and port identifiers) in Option 82. (Step 304.)

In step 306, DHCP server 263 (or another component of metaserver 245) inspects the DHCPDISCOVER request to determine (in step 308) whether the middleware server has been moved or replaced. In this example, step 308 involves comparing the middleware ID and location information with stored middleware server ID/location associations. If a known middleware ID is coming from a new location, it is presumed that the middleware server has been moved. If a new middleware server appears in a location previously associated with another middleware server, it is presumed that a middleware server has been replaced. If the middleware server has been moved or replaced, a complete provisioning process is performed. (Step 310.) If the middleware server has not been moved or replaced, a partial provisioning process is performed, e.g., according to a predetermined set of parameters that have been selected by the responsible IT personnel. In one such example, it has been determined that the middleware server will simply be given an IP address and a domain name. (Step 312.)

Figure 3D:
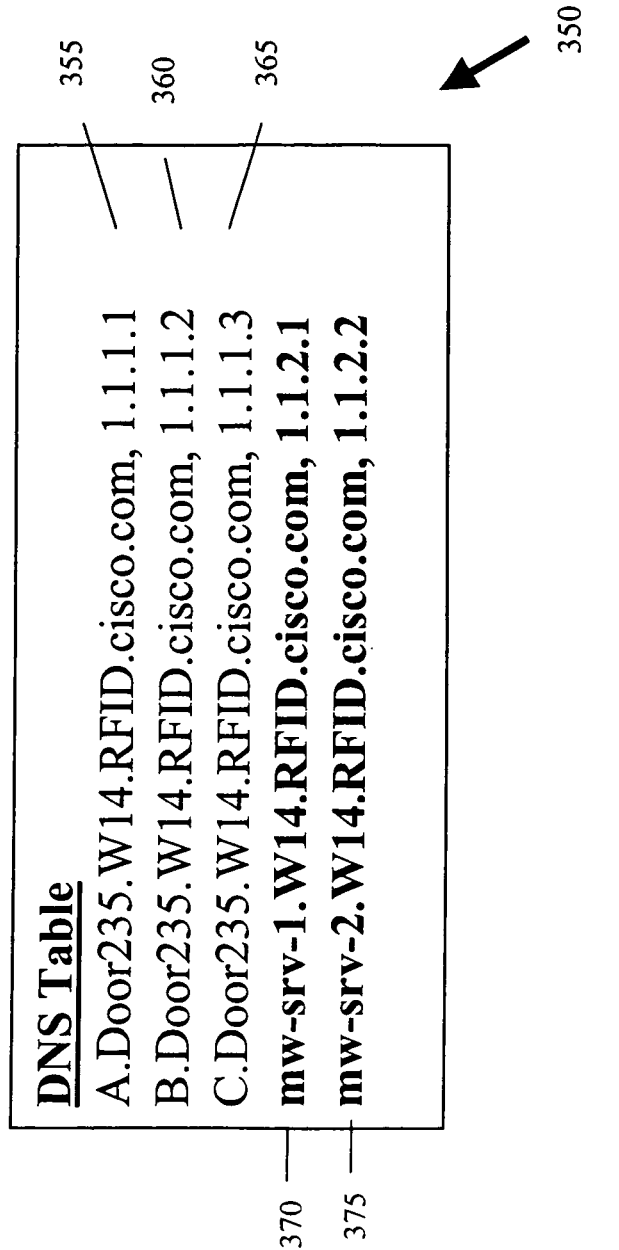

As part of the provisioning process, middleware servers 215 and 220 are provided with network addresses, including domain names and IP addresses. Accordingly, entries 370 and 375 are added to DNS table 350, as shown in FIG. 3D.

Figure 3E:
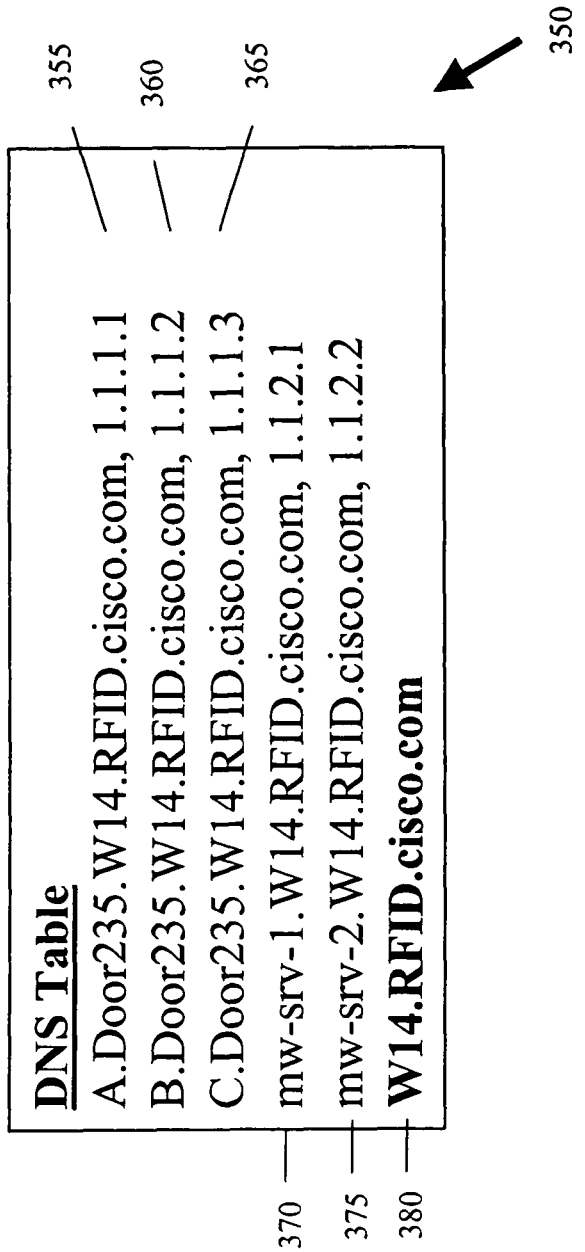

Returning again to FIG. 3A, a site DNS is created for Warehouse 14 in step 315. This entry could be created by application server 205, by another device or manually. Entry 380 of FIG. 3E illustrates such a DNS entry, in the format <site>.RFID.<domain>. In step 320, RFID devices request middleware servers. Here, the RFID devices transmit requests for middleware servers to assigner 253 of metaserver 245. Assigner 253 determines that RFID devices A and C will be associated with middleware server 220 and RFID device B will be associated with middleware server 215 (step 325).

In step 330, the middleware servers update the DNS entry for each RFID device with identification information for the middleware server. In this example, the DNS entry for each RFID device is updated with a TXT record that states the domain name of the associated middleware server.

Accordingly, TXT record 385 ("TXT mw-srv-1.W14.RFID.cisco.com") is added to DNS entry 355 for RFID device A. (See FIG. 3F.) Similarly, TXT record 390 ("TXT mw-srv-2.W14.RFID.cisco.com") is added to DNS entry 360 for RFID device B and TXT record 395 ("TXT mw-srv-1.W14.RFID.cisco.com") is added to DNS entry 365 for RFID device C. Preferably, the same procedure applies if an RFID device is added/replaced after other RFID devices in the network have been initialized, provisioned, etc., as described above.

Although assigner 253 is included in metaserver 245 in this example, assigner 253 could be implemented in various ways, e.g., as a stand-alone device, as hardware and/or software incorporated into a module of another network device, etc. The network device could be, for example, a switch (e.g., a Catalyst 6500 switch provided by Cisco) or a middleware server.

In this example, assigner 253 is a type of load balancer. However, assigner 253 preferably does not re-allocate RFID devices to other middleware servers as frequently as a normal TCP load balancer would re-route network traffic. Instead, assigner 253 preferably re-allocates RFID devices to other middleware servers only when certain conditions exist, e.g., when devices boot up, during a maintenance cycle, when middleware servers are added to the network, etc. Otherwise, the associations between middleware servers and RFID devices would frequently change and the new associations would need to be communicated to other parts of network 200 (e.g., to application server 205).

According to some implementations, the protocol used for the query/response between the RFID device and the metaserver differs from the protocol used in routine communications on the RFID network. In some such implementations of the assigner described herein, the protocol is one used by conventional TCP load balancers.

The methods described above facilitate the process of obtaining RFID data from a given location. For example, if application software 210 (see FIG. 2) requests RFID data from location 235 (which is a door of Warehouse 14), the DNS entry 380 for this site is resolved and an application request is made for the IP address of W14, Door 235. In response, application server 205 queries for the network addresses of all RFID devices deployed at door 235, e.g., "*.Door235.W14.RFID.cisco.com." (The asterisk here signifies a search for all entries that match or have entries related to Door 235.) Network addresses for these RFID devices (including the TXT records that indicate associated middleware servers) are returned to application server 205. Accordingly, the application server now knows the middleware server associated with each RFID device deployed at door 235 of Warehouse 14. The application server can then poll these middleware servers in order to obtain RFID data for door 235 and complete the application request.

Figure 4A:
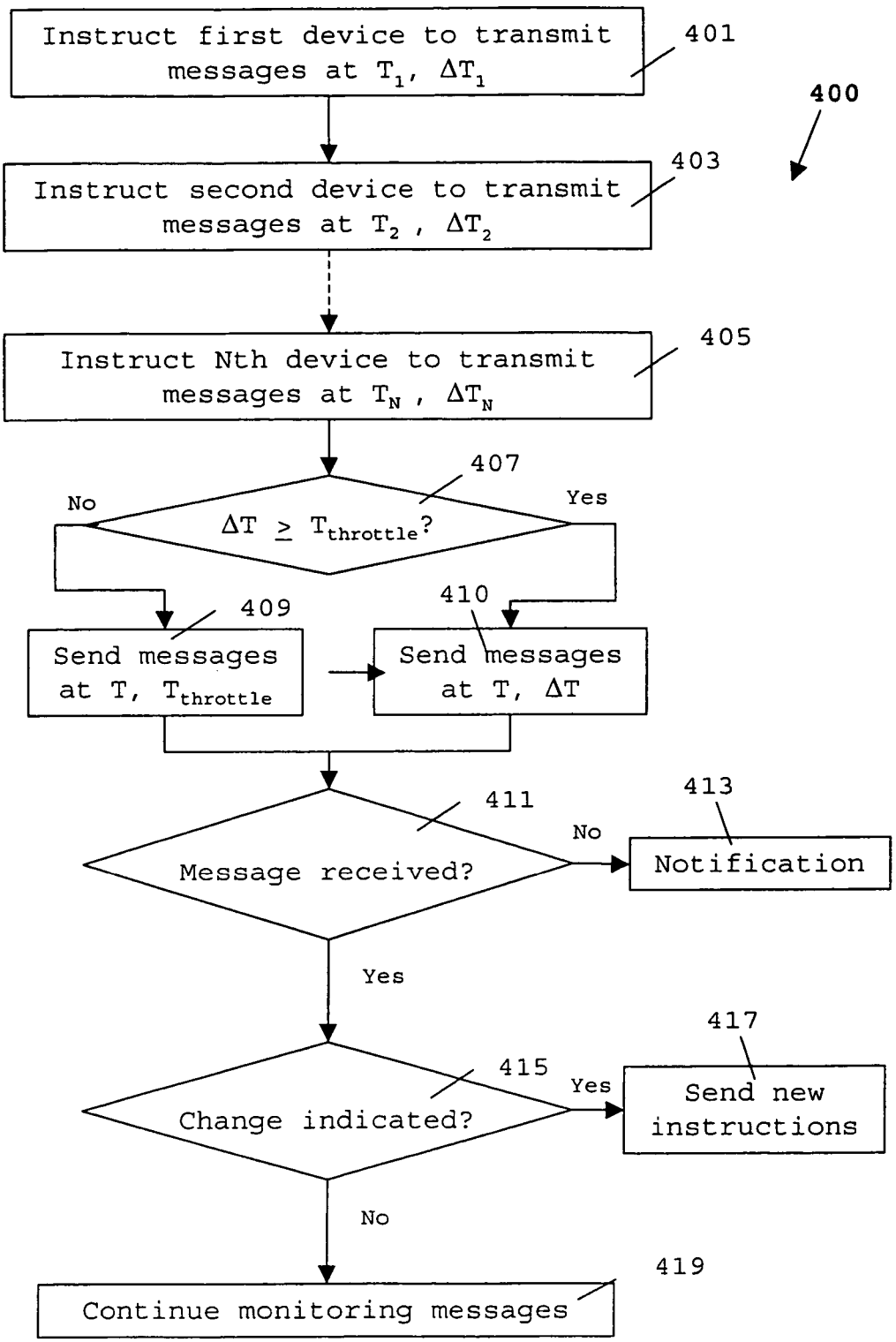
FIGS. 4A, 4B and 4C are flow charts that outline methods 400, 420 and 435 of the present invention.

FIG. 4A is a flow chart that outlines method 400 according to some implementations of the present invention. In step 401, a first device is instructed to transmit a first message at a first time. The message may be in any convenient predetermined format, including but not limited to syslog and SNMP formats. However, in this example, the message will be a single packet in a format that will sometimes be referred to herein as a "heartbeat" or a "heartbeat packet."

The instructions are preferably provided to a device during a provisioning process, e.g., as described elsewhere herein, and stored in a memory of the device for execution by the device's CPU. The provisioning methods (and other methods) described in the Cisco RFID Applications, which have been incorporated herein by reference, may advantageously be used for implementing some aspects of the present invention. In some implementations, for example, the instructions are provided to the first device as part of a provisioning or reprovisioning process via a DHCPFORCERENEW command. The command may originate from a server, a host device operated by a network administrator, etc.

In this example, the instructions call for the first device to transmit a first packet at a first time ($T_1$) and to keep transmitting subsequent packets at a predetermined first time interval ($\Delta T_1$) until further instructions are received. The first time interval is preferably tailored to the expected usage of the first device during the time beginning at $T_1$. For example, if the device is expected to be inactive, the first time interval is preferably a relatively longer time interval than if the first device is active or is soon expected to be active.

The message may be, for example, a customized syslog packet that contains identification information for uniquely identifying the device. In some implementations of the invention, the message is in a format that is consistent with SNMP. The identification information may include, e.g., the EPC code of the device. Moreover the packet preferably contains authentication information and a time stamp. The authentication information may be, for example, a secret that is assigned during the provisioning process. All or part of the packet may be encrypted. In some implementations, only the authentication information is encrypted.

The message may contain other information, e.g., diagnostic information that may be useful for troubleshooting. Examples of customized syslog packets for implementing the present invention are described below with reference to FIG. 5A.

In method 400, a plurality of networked devices is instructed to transmit messages at different times and possibly at different time intervals. Accordingly, a second device is instructed to transmit a message at $T_2$, another message at $T_2+\Delta T_2$ (a predetermined second time interval), etc. (Step 403.) As with the first device, the second time interval is preferably set according to the expected usage of the second device. This procedure is applied to all N devices in a network: the $N^{th}$ device is instructed to transmit a packet at $T_N$, another packet at $T_N+\Delta T_N$ (a predetermined $N^{th}$ time interval), etc. (Step 405.) In some implementations, at least some of the times and/or time intervals are "staggered" in order to minimize the number of packets that are expected to arrive (e.g., at a syslog server) during a particular time interval.

In this example, all of the messages are sent to the same device, e.g., the same server. However, as will be described in more detail below, some implementations of the invention provide for messages to be sent to more than one server. For example, the first device may be instructed to send messages to a first server, the second device may be instructed to send messages to a second server, etc. Multiple syslog servers can provide redundancy and resiliency. Alternatively, the devices may be instructed to multicast messages to a plurality of servers. In other implementations, devices will be instructed to send one message types to one server and another message type to another server. In still other implementations, syslog servers listen passively for syslog messages.

Some implementations of the invention provide a time-based message throttle that establishes a minimum time interval between messages. Such a time-based message throttle may be specified, for example, during the device provisioning process and/or by an SNMP manager device. Such implementations are useful in preventing the network from becoming overloaded with messages that are being transmitted too frequently, e.g., in response to a "man-in-the middle" attack by a hacker. For example, a middleware server or another such device may be spoofed into instructing each device to send an SNMP message in a very short time interval, e.g., every 5 milliseconds.

Accordingly, in step 407, each device determines whether the time internal in its instructions ($\Delta T$) is greater than or equal to a predetermined minimum time interval between transmissions ($T_{throttle}$). If not, the messages are sent at the indicated initial time T and at intervals of $T_{throttle}$. (Step 409.) However if the time internal in its instructions is greater than or equal to $T_{throttle}$, the messages are sent at the indicated initial time T and at intervals of the indicated $\Delta T$. (Step 410.)

In step 411, it is determined whether heartbeat packets have been received from devices 1 through N (e.g., by a syslog server). In some preferred embodiments, it will be determined whether each heartbeat packet has been received within a predetermined time. Preferably, the packets' receipt will be determined during an ongoing process, rather than at one particular phase of method 400. In some implementations, received packets are archived and in other implementations received packets are discarded. In yet other implementations, certain types of heartbeat packets (e.g., those containing information about device or network status) are stored and other types of heartbeat packets are discarded. Preferably, an event timer will be reset after each packet is received.

In preferred implementations, an authentication process will be applied to at least some packets. In some implementations, the authentication process involves comparing a hashed portion of the heartbeat that includes a secret from a device with what the heartbeat server expected. The secret authorized for the device that sent the heartbeat, e.g., by referencing a database, a lookup table, etc is used by the server to generate a hash value. If the correct secret was included in the heartbeat from the device, it will be assumed that the device indicated by the identification information (e.g., an EPC code) in the heartbeat was the device that transmitted the heartbeat. The authorization process is preferably not applied to all packets. For example, an authorization process may be applied to every M packets, where M is a predetermined number (50, 100, 1,000, 10,000, or any appropriate number). Heartbeats purportedly from devices involving critical operations, valuable items, etc., may be authenticated more often than heartbeats that appear to be from other devices.

If an expected packet is not received within a predetermined time, in some implementations a notification procedure will then ensue (step 413). For example, a communication (e.g., an email, voice mail, text message, etc.) may be sent to a network administrator regarding the non-responsive device (e.g., "No heartbeat from RFID reader 3313 at warehouse 111"). In other implementations, a notification will be sent only after a predetermined number of expected packets have not been received from a non-responsive device. In some implementations, a non-responsive device will be instructed to reboot, e.g., via a DHCP FORCERENEW command.

It will be appreciated by those of skill in the art that the steps of method 400 are not necessarily performed in the order indicated. For example, the Nth device may actually be provided with instructions for transmitted a packet before the first device is provided with such instructions. As noted above, the packets' receipt will preferably be determined as part of an ongoing process rather than during only one sequential step of method 400. Moreover, the step of determining whether a change of instructions is warranted (step 415) could occur at various times.

In step 415, it is determined whether a change is required in the packets transmitted by any of devices 1 through N. This determination could be made in response to various factors, including the time of day, calendar (e.g. holiday versus working day), knowledge of an event that will involve a device, indications of a device's recent activity levels, etc. For example, new instructions calling for a change in heartbeat frequency could be issued in response to a determination that a particular device's activity level is about to change. (Step 417.) In one such example, a database accessible to an administrative device (e.g., a server, a host device, etc.) indicates that a delivery is expected at a warehouse door at 6:00 a.m. An RFID device at the warehouse door has been inactive for a number of hours because the warehouse has been closed for the night. Therefore, the RFID device has previously been instructed to transmit heartbeats at a relatively long time interval (e.g., once every hour). Because of known event and the expected change in activity of the RFID device, the administrative device transmits instructions that tell the device to increase the heartbeat frequency to, e.g., 5 minutes.

However, the new instructions may indicate that the device should transmit a different type of message and/or a message that includes additional information. For example, the new instructions may indicate that the device should transmit a status message, a partial statistics message, a full statistics message, etc., each of which may have its own format. In some instances, the new type of message may require more than one packet to transmit the desired information.

The new instructions may be part of configuration/personality software that is transmitted to the RFID device. For example, the device may be instructed to reboot, assume a personality appropriate for that of an inbound warehouse door, change its antenna reading pattern and increase its heartbeat frequency.

A change may also be indicated by information contained in the heartbeat itself. As noted elsewhere, messages, including heartbeat messages, may contain various types of information regarding the device that transmitted the message, the network in which the device is located, or other information. If information in the message suggests, for example, that the device may be malfunctioning, the device may be instructed to provide messages with other diagnostic information. Exemplary scenarios of this type are discussed below.

However, in some implementations of the invention, the device may be pre-programmed to change its message frequency and/or to change the information contained in the message. In some such implementations, the device is pre-programmed to change its message frequency and/or to change the information contained in the message at predetermined times. In alternative implementations, the device may be pre-programmed to change its message frequency and/or to change the information contained in the message if a predetermined condition occurs. For example, the device may be preprogrammed to transmit device and/or network diagnostic information if the CPU usage of the device exceeds a threshold level.

Figure 4B:
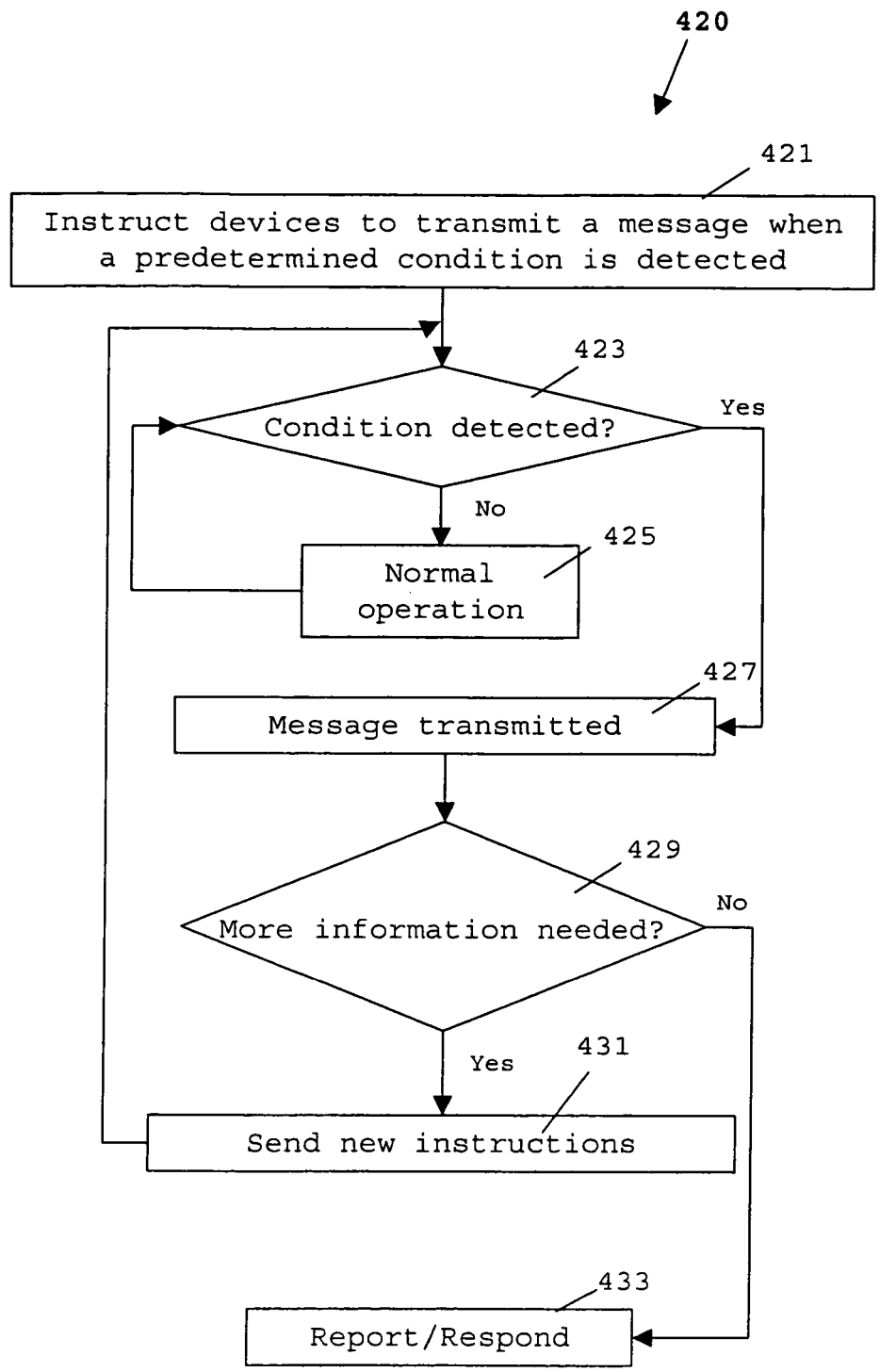
Figure 4C:
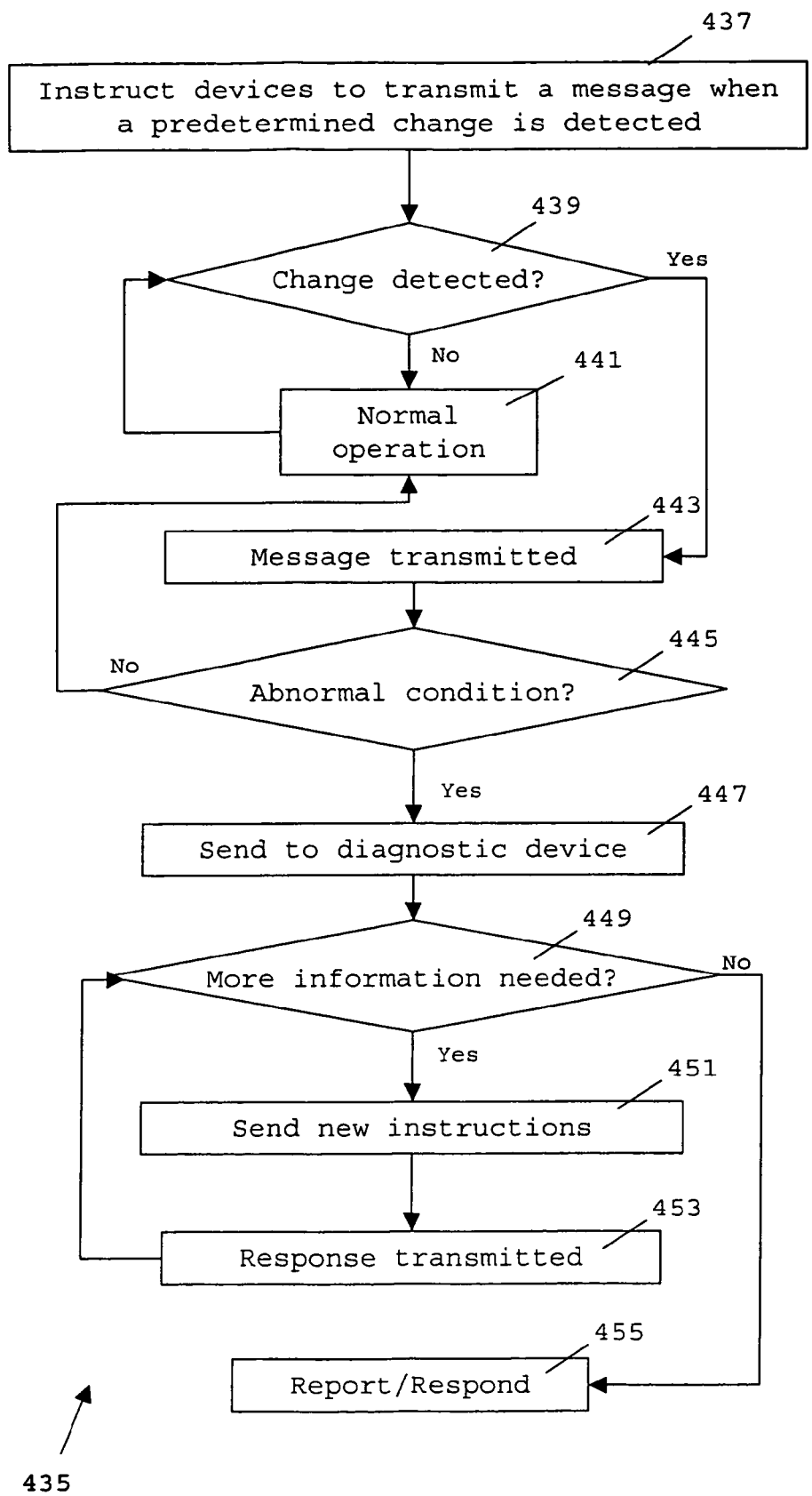

Some such implementations will now be discussed with reference to FIGS. 4B and 4C. The status of a networked device, e.g., a networked RFID device, a networked sensor, etc., may be determined with reference to messages that are triggered by the occurrence of one or more predetermined conditions. For example, a message may be generated when one or more criteria have reached predetermined levels and/or have changed by more than a predetermined amount. The predetermined conditions will sometimes be referred to herein as "triggers." A trigger may vary according to factors such as the age of the device, how often the device is used and the relative harshness of the environment in which the device is deployed.

Accordingly, in step 421, networked devices are instructed to transmit a message when one or more such triggers occurs/is detected. The instructions may occur, for example, as part of a provisioning process described herein and/or in the Cisco RFID Applications. The messages triggered by the detection or occurrence of a trigger (step 423) preferably includes information relevant to the health, accuracy and/or reliability of the device and/or of the network that includes the device. When no such trigger is detected, the device operates normally and transmits data on the network, e.g., RFID tag reads. (Step 425.) In some implementations, the transmission of message may be delayed (e.g., by a time interval that is no greater than a predetermined maximum time interval) until a device is not busy.

We have already discussed one trigger that could be evaluated in step 423, that being the passage of time. However, many other triggers are within the scope of the present invention. For example, a device may be triggered to send a message after a predetermined number of operations. An RFID reader, for example, may determine in step 423 that it has performed a predetermined number of "reads" and that the instructions received in step 421 indicate that this condition requires a message to be sent. (Step 427.) Other potential triggers include, but are not limited to, device memory usage, the percentage of "good" reads (either in absolute terms or in relative terms, e.g., as compared to nearby devices), the size of a TCP window, the inability to complete reads within a read cycle, or any other metric that has been determined to have a correlation with device and/or network functionality.

In preferred implementations, multiple message formats are supported, e.g., heartbeat only, partial statistics, full statistics, etc. Preferably, messages will include version information by which the version of various relevant hardware and software may be indicated, including but not limited to the reader, the EPCGlobal protocol, the version of syslog, the version of SNMP, etc. Messages may be transmitted in more than one packet, if necessary.

In preferred implementations, the type of message transmitted will correspond to the type of trigger. For example, when an RFID reader determines in step 423 that it has performed a predetermined number of "reads" necessary to trigger a message, the RFID reader may send partial or full statistics to a predetermined server.

Moreover, messages may be sent to one or more devices, e.g., to one or more servers, according to various criteria. In some implementations, the device to which the message is sent will correspond to the type of trigger.

However, in this implementation, a single device, e.g., a single server, is receiving the messages. The messages are evaluated in step 429. If the server determines that additional information is required, for example, to evaluate the health of the device that transmitted the message (or the health of the network within which the device is deployed), the server sends new instructions to the device. (Step 431.) In this example, the new instructions tell the device to set one or more additional triggers. The device will send one or more additional messages if the device detects the occurrence of the additional triggering event(s). (Step 423.)

In alternative implementations, the new instructions require the device to transmit one or more types of messages without requiring the occurrence of any other event. In some such implementations, the new instructions are in a format consistent with that used by SNMP managers to send commands to SNMP agents.

The server evaluates the new message(s) in step 429 and determines whether more information is required to determine device and/or network status. In this example, the server will continue to change the trigger until the server determines that it has sufficient diagnostic information. At that time, the server will respond in a predetermined manner, e.g., by sending an email, a voice mail, a text message, etc. to a network administrator indicating the condition of the device and/or network. (Step 433.)

Some implementations of the invention provide multiple servers with different diagnostic capabilities for analyzing triggered messages. One such implementation will now be described with reference to FIG. 4C. As before, devices are instructed to transmit messages based on the occurrence of predetermined triggers. (Step 437.) In this example, however, the devices are instructed to transmit certain types of messages only when a predetermined change in one or more criteria is detected. (Step 439.) For example, if the amount of memory used by an RFID reader has changed by a predetermined amount, a predetermined message type may be triggered. However, any convenient "delta" may be used.

After such a message is triggered (step 443), the message is evaluated by a first server to determine whether an abnormal condition may be indicated. (Step 445.) If not, normal operation continues. (Step 441.) However, if a potentially abnormal condition is detected, the message is sent to a second server for diagnosis. (Step 447.) The second server may be running more powerful diagnostic software. Moreover, the second server may only need to evaluate a small percentage of messages, as compared to the first server. This allows the second server more time to run diagnostics and troubleshoot potential problems with the transmitting device and/or the portion of the network in which the device is deployed.

If the second server requires additional information, the second server sends new instructions to the device. (Step 451.) As described above, the new instructions may comprise new triggers and/or instructions to send additional information immediately. The device sends additional information in step 453. The second server continues to evaluate the information received from the device and continues to request additional information from the device and/or from nearby devices, if necessary. After the second server has determined what action should be taken with regard to the device, the second server responds accordingly. (Step 455.) For example, the second server may send a report to a network administrator indicating that the device needs to be replaced, that its antenna needs adjustment, etc.

Figure 5A:
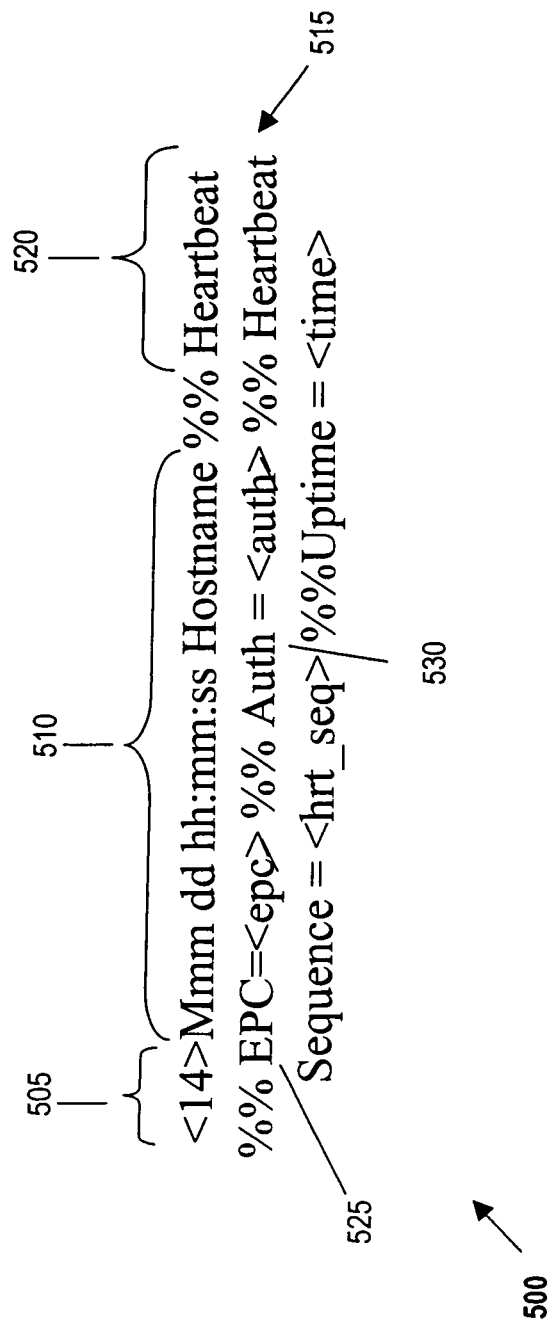
FIG. 5A illustrates one exemplary format of a heartbeat packet of the present invention.

FIG. 5A illustrates one exemplary heartbeat format for implementing some aspects of the invention. It will be appreciated by those of skill in the art that other formats may be used for implementing the present invention. According to RFC 3164, "[t]he payload of any IP packet that has a UDP destination port of 514 MUST be treated as a syslog message." Accordingly, even those implementations of the invention that are based in part on syslog need not be in a particular format. Nonetheless, implementations of the present invention that use syslog are preferably formatted in the manner suggested by RFC 3164.

Therefore, the exemplary heartbeat packet 500 of FIG. 5A includes the priority ("PRI") 405, header 510 and message 515 portions set forth in RFC 3164. However, one or more portions of heartbeat packet 500 (e.g., the message portion) are customized to implement the present invention. PRI portion 505 may be used, for example, to encode one of the 24 Facility codes and/or one of the 8 Severity codes that are set forth in RFC 3164. Header portion 510 includes a time and date stamp, along with an indication of the hostname or IP address of the device.

The remainder of heartbeat packet 500 is message portion 515. Message portion 515 preferably begins with "TAG" portion 520, which indicates the name of the program and/or process that generated the packet (here, "Heartbeat"). The rest of message portion 515 is the "content" portion, which includes identification information 525 and authentication information 530 in this example. Here, identification information 525 is the EPC of the device transmitting the heartbeat. In some embodiments, authentication information 530 is a secret that has previously been provided to the device during a provisioning process, e.g., as described in co-pending U.S. patent application Ser. No. 10/866,285, which has previously been incorporated by reference. The authentication information is preferably encrypted (e.g., hashed) by the device that sent the heartbeat.

One preferred method to hash the data is using an algorithm similar to MD-5. In order to ensure that illicit decryption of the packets are not done, and hence a replay or misinformation attack is done, at least one the keys making up the hash algorithm should be variable. The use of time or a sequence key are common methods. Time is used as syslog packets should contain a timestamp per RFC 3164. However this key is open in the packet and may be used in decryption attacks. A Heartbeat sequence could be used where a random number is chosen and incremented based on a predetermined integer for each heartbeat packet sent. This integer could be per device specific and random, making the sequence value difficult to determine. Further as it is not transmitted, it makes it much more difficult to reverse decrypt.

Some heartbeat packets 500 may serve only to identify the device that transmitted the heartbeat and the time that the heartbeat was transmitted. However, heartbeat packet 500 (or packets having other formats) may contain other types of information. Preferably, this information is set forth according to standardized option fields having predetermined formats. One such exemplary format is CPU_Memory_Disk Utilization. The CPU field may contain, for example, the average percent utilization of the CPU since the time that the last heartbeat was sent and The Memory and Disk Utilization fields could contain information regarding their respective utilizations.

In a second example, heartbeat packet 500 contains LAN interface and/or IP packet statistics, preferably in a predetermined format. For example, such packets could include information regarding "receiver not ready" conditions, dropped packets or frames, megaframes, wrong format of packets or frames, etc.

In a third example, heartbeat packet 500 contains device Uptime information, preferably in a predetermined format. For example, such packets include a "time since last boot" in seconds. Thus an application may determine if the Uptime has lowered from a previous heartbeat packet that the device has been rebooted or it has reset itself.

Alternatively, the heartbeat may contain information specific to a particular vendor or device. Such information could be used for error reporting, product differentiation, or other purposes. If the device is an RFID reader, the heartbeat could include information regarding the performance of the reader, e.g., the current antenna set-up, interference information, incomplete reads, percent of "good" reads, multipath information, etc.

Figure 5B:
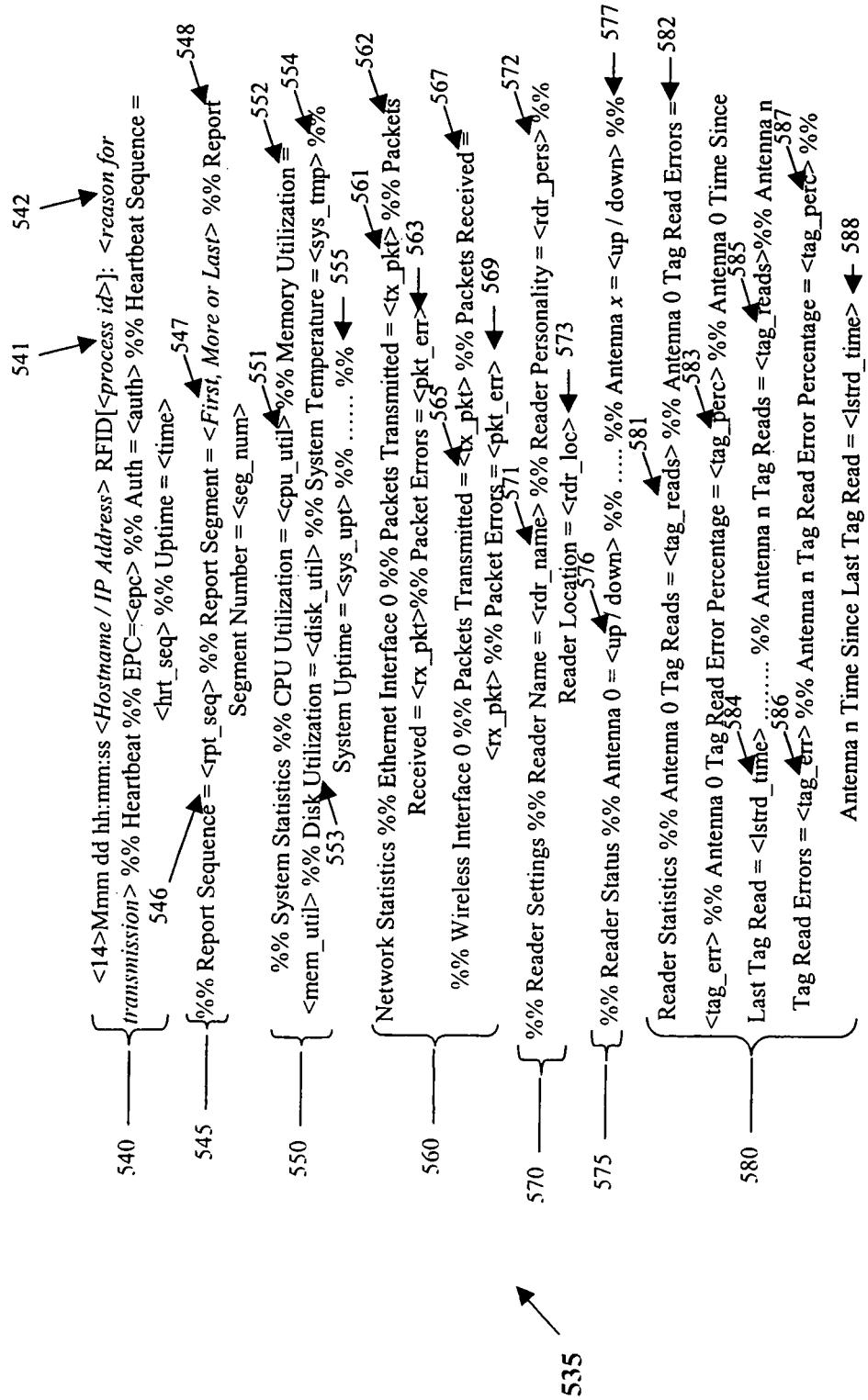
FIG. 5B illustrates one exemplary alternative packet format that may be used to implement some aspects of the present invention.

Another exemplary packet format that may be used for implementing some aspects of the invention is depicted in FIG. 5B. The fields of packet 535 have been segregated into portions 540 through 580 for readability. Those of skill in the art will realize that various permutations and modifications could be made to packet 535 that are within the scope of the invention. For example, more or fewer fields could be included in packet 535. Moreover, the field definitions of packet 535 could be abbreviated.

In this example, portion 540 includes the fields of packet 500 and a number of additional fields. One such field is process ID field 541, which is the local ID of the process running on the reporting device (e.g., an RFID reader). Reason for transmission field 542 indicates the reason for sending packet 535. Such reasons could include the running of a heartbeat timer, the achievement of a status level or a statistic level, etc. For example, reason for transmission field could indicate that CPU utilization exceeded a predetermined threshold, e.g., "CPU Level Exceeded 65%."

Report information portion 545 includes report sequence field 546, which indicates a sequence number corresponding to the packet. For example, the reporting device may create a random number in a range that is incremented for each new packet sent out.

Pursuant to RFC 3164, a syslog packet cannot exceed 1024 bytes. Accordingly, report segment field 547 provides for the option of sending messages that span multiple packets. In this exemplary implementation, report segment field 547 would have one of three options: (1) "Last" if (a) the packet is 1024 or less or (b) if there has been a series of data packets and this packet will be the final packet; (2) "First" if more than 1024 of data needs to be sent and this is the first packet in a series; or (3) "More" if the packet is a second or later of data packets in a series, but not the last packet.

Report segment number 548 indicates the packet's position in a series of packets when multiple data packets are sent in a message. In this example, the default value for report segment number 548 is 1.

System statistics portion 550 provides information regarding the reporting device (e.g., statistics regarding an RFID reader). In this example, system statistics portion 550 provides information about the CPU utilization (field 551), memory utilization (field 552), disk utilization (field 553), temperature (field 554) and device uptime (field 555). The temperature may be the ambient temperature in the vicinity of the device, the temperature of a particular component of the device, etc.

In this example, network statistics portion 560 includes information regarding various interfaces of the reporting device. Fields 561 and 562 provide information regarding the packets transmitted and received by an Ethernet interface. Field 563 provides packet error information for the interface. Similarly, fields 565 and 567 provide information regarding the packets transmitted and received by a wireless interface. Field 569 provides packet error information for the wireless interface.

Portion 570 indicates settings and other information pertaining to the reporting device. Here, portion 570 includes the device name in field 571, personality information in field 572 and location data in field 573. For example, such data may be of the types described in the Cisco RFID Applications.

Portion 575 indicates reporting device status information. In this example, an indication of whether each antenna of an RFID reader is made in fields 576 through 577. Additional information, such as antenna gain information, etc., may be indicated for one or more antennas of the device.

Portion 580 indicates related statistics for the reporting device. In this example, the tag reads (e.g., during a particular time interval), read errors, read error percentage and the time since the last tag read are provided for a first antenna in fields 581, 582, 583 and 584, respectively. The same types of information are provided for the nth antenna in fields 585, 586, 587 and 588, respectively.

The DHCP protocol is used in some preferred implementations of the present invention because it offers various convenient features. For example, the DHCP protocol allows pools or "scopes" of TCP/IP addresses to be defined. A DHCP server can temporarily allocate or "lease" these TCP/IP addresses to host devices. An IP address that is not used for the duration of the lease is returned to the pool of unallocated IP addresses. In addition, the DHCP server will provide all related configuration settings, such as the default router, Domain Name Service ("DNS") servers, subnet mask, etc., that are required for the proper functioning of TCP/IP.

For implementations using the DHCP protocol, DHCP Options may be used to pass provisioning information, including instructions for the desired type and frequency of heartbeats that a device should transmit. The DHCP protocol is defined in RFC 2131 and DHCP Options are set forth in, for example, RFCs 2132, 3004 and 3046. RFCs 2131, 2132, 3004 and 3046 are hereby incorporated by reference for all purposes.

According to some implementations of the invention, a DHCP server causes an update of a device's heartbeat type or frequency (and/or other device reconfiguration) using a DHCPFORCERENEW command as defined by RFC 3203, which is hereby incorporated by reference in its entirety. In some such implementations, the CPU of the RFID device registers the DHCPFORCERENEW command and starts a new provisioning cycle, for example as described with reference to FIGS. 6 and 7 of U.S. patent application Ser. No. 10/866,285, which has been incorporated by reference in its entirety.

However, in other implementations of the invention, the device may be pre-programmed to change its heartbeat frequency and/or type at predetermined times and/or if one or more predetermined conditions occur. In yet other implementations, a device may be preprogrammed to request new instructions for heartbeat frequency and/or type at a particular time or if certain conditions occur. In some such implementations, the device does so via a DHCPREQUEST, e.g. as described in U.S. patent application Ser. No. 10/866,285.

In order to secure a command, in some implementations a cached secret is hashed within the command. For example, the secret can be included with the EPC code of the RFID device.

One method for creating an authentication key is as follows:

MD-5 (EPC, Challenge, Secret)

By adding in the variable of a random Challenge, no replay attacks of the hash code could be used. Because the EPC is included, the authentication can be further validated to come from a specific device.

The methods and devices of the present invention have very broad utility, both in the public and private sectors. Any enterprise needs to keep track of how its equipment is being deployed, whether that equipment is used for commercial purposes, for military purposes, etc. RFID devices that are networked according to the present invention can provide necessary information for allowing enterprises to track equipment and products (or groups of products). The information that will be provided by RFID devices that are networked according to the present invention will be of great benefit for enterprise resource planning, including the planning of manufacturing, distribution, sales and marketing.

Using the devices and methods of the present invention, RFID tags and associated RFID devices (such as RFID readers and printers) can form part of a network for tracking a product and its history. For example, instead of waiting in a checkout line to purchase selected products, a shopper who wishes to purchase products bearing RFID tags can transport the products through a door that has multiple RFID readers deployed nearby. The readers may be virtualized and data from the virtualized readers may be obtained by application software. For example, the application software may obtain EPC information regarding the products and can use this information to update a store inventory, cause a financial account to be debited, update manufacturers', distributors' and retailers' product sales databases, etc.

Read/write RFID tags can capture information regarding the history of products or groups of products, e.g., temperature and other environmental changes, stresses, accelerations and/or vibrations that have acted upon the product. It will be particularly useful to record such information for products that are relatively more subject to spoilage or other damage, such as perishable foods and fragile items. By using the methods of the present invention, this information will be used to update databases maintained by various entities (e.g., manufacturers, wholesalers, retailers, transportation companies and financial institutions). The information will be used not only to resolve disputes (for example, regarding responsibility for product damage) but also to increase customer satisfaction, to avoid health risks, etc.

Another example of an RFID network is depicted in FIG. 6. Here, RFID network 600 includes warehouse 601, factory 605, retail outlet 610, financial institution 615 and headquarters 620. As will be appreciated by those of skill in the art, network 600 could include many other elements and/or multiple instances of the elements shown in FIG. 6. For example, network 600 could include a plurality of warehouses, factories, etc.

In this illustration, products 627 are being delivered to warehouse 601 by truck 675. Products 627, which already include RFID tags, are delivered through door 625. In this example, RFID reader 652 is connected to port 662 of switch 660.

Here, active middleware server 607 and standby middleware server 609 are connected to ports 664 and 668, respectively. Middleware server 607 provides data collection and filtering services, such as taking out redundancies, searching for particular RFID tag reads, etc. Only a portion of the data received by a middleware server is routinely made available to higher-level applications. Accordingly, middleware server 607 filters the RFID reads from RFID readers in warehouse 601 and transmits only selected reads to headquarters 620. In this example, headquarters 620 includes storage devices 665, workstations 667, metaserver 670 and application server 677.

Here, switches 630 and 660 are connected to the rest of RFID network 600 via gateway 650 and network 625. Network 625 could be any convenient network, but in this example network 625 is the Internet. RFID reader 652 reads each product that passes through door 625 and transmits the EPC code corresponding to each product on RFID network 600.

RFID tags may be used for different levels of a product distribution system. For example, there may be an RFID tag for a pallet of cases, an RFID tag for each case in the pallet and an RFID tag for each product. Accordingly, after products 627 enter warehouse 601, they are assembled into cases 646. RFID printer 656 makes an RFID tag for each of cases 646. In this example, RFID printer 656 is connected to port 666 of switch 660. RFID printer 656 could operate under the control of PC 647 in warehouse 601, one of PCs 667 in headquarters 620, or some other device.

RFID reader 624, which is connected to port 614 of switch 630, reads the EPC code of each case 646 and product 627 on conveyor belt 644 and transmits this information to middleware server 607. Similarly, RFID reader 626, which is connected to port 616, reads the EPC code of each case 646 and product 627 that exits door 604 and transmits this information to middleware server 607. Cases 646 are loaded onto truck 685 for distribution to another part of the product chain, e.g., to retail outlet 610.

Each of the RFID devices in network 600 preferably has a "personality" suitable for its intended use. For example, device 652 could cause reassuring tone to sound and/or a green light to flash if an authorized person or object enters door 625. However, device 652 might cause an alarm to sound and/or an alert to be sent to an administrator on network 600 if a product exits door 625 or an unauthorized person enters or exits door 625.

Figure 7:
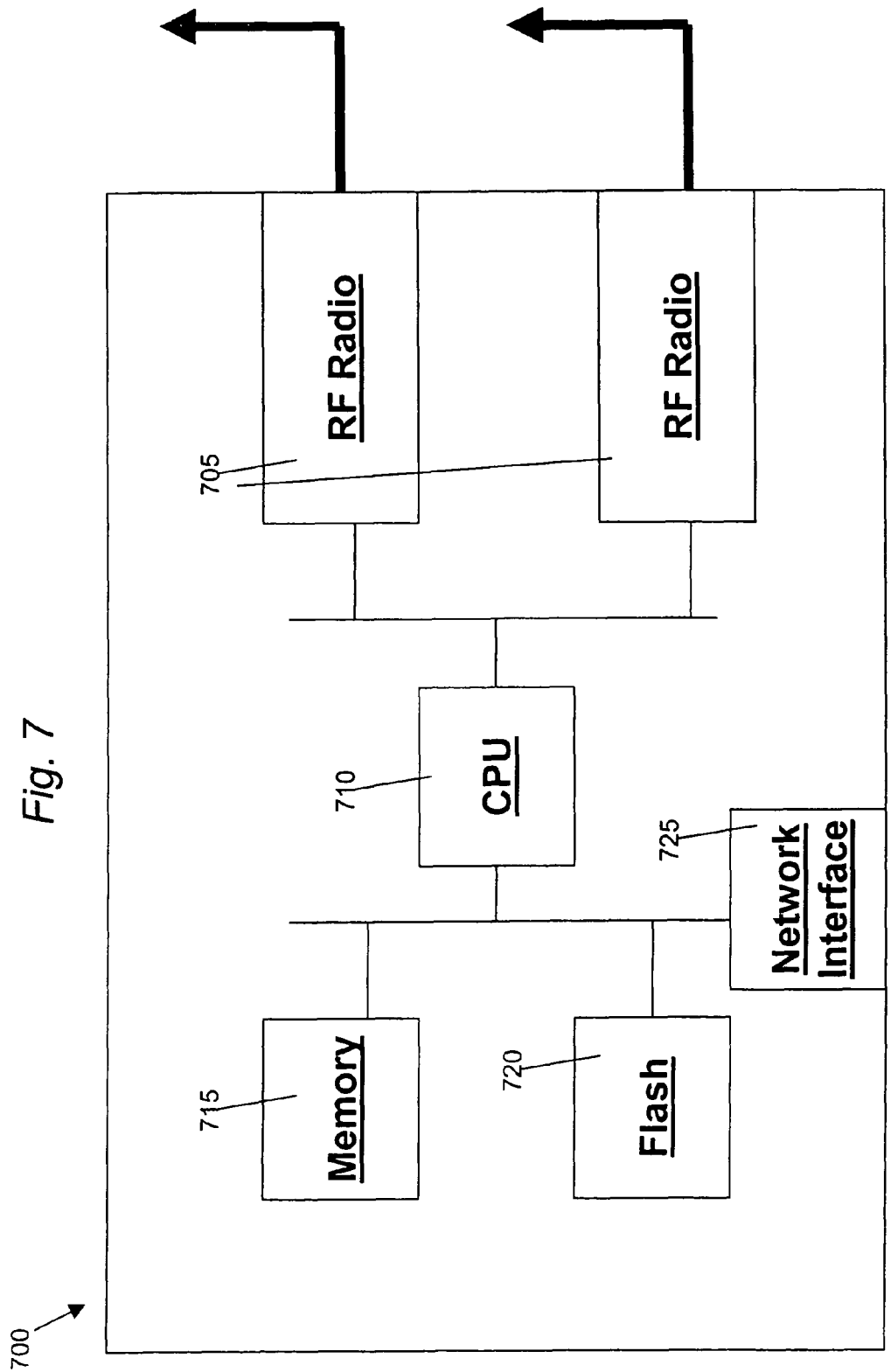
FIG. 7 is a block diagram of an exemplary RFID reader that may be configured to perform some methods of the present invention.

FIG. 7 illustrates an RFID reader that can be configured to perform methods of the present invention. RFID reader 700 includes one or more RF radios 705 for transmitting RF waves to, and receiving modulated RF waves from, RFID tags. RF radios 705 provide raw RF data that is converted by an analog-to-digital converter (not shown) and conveyed to other elements of RFID reader 700. In some embodiments, these data are stored, at least temporarily, by CPU 710 in memory 715 before being transmitted to other parts of RFID network 200 via network interface 725. Network interface 725 may be any convenient type of interface, such as an Ethernet interface.

Flash memory 720 is used to store a program (a "bootloader") for booting/initializing RFID reader 700. The bootloader, which is usually stored in a separate, partitioned area of flash memory 720, also allows RFID reader 700 to recover from a power loss, etc. In some embodiments of the invention, flash memory 720 includes instructions for controlling CPU 710 to form "DHCPDISCOVER" requests, as described elsewhere herein, to initiate a provisioning/configuration cycle. In some implementations, flash memory 720 is used to store personality information and other configuration information obtained from, e.g., a DHCP server during such a cycle.

However, in preferred implementations, such information is only stored in volatile memory 715 after being received from, e.g. a DHCP server. There are advantages to keeping RFID devices "dumb." For example, a network of dumb RFID devices allows much of the processing load to be centralized (e.g., performed by server 270 of network 200), instead of being performed by the RFID devices. Alternatively, the processing load can be decentralized, but only to trusted devices (such as PC 247 of network 200).

Configuration information is downloaded from, e.g., a central server to memory 715. Updates may be instigated by the central server or selected, trusted devices. New versions of the image file (e.g., the running, base image necessary to operate the RFID device) are copied into flash memory 720. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 8:
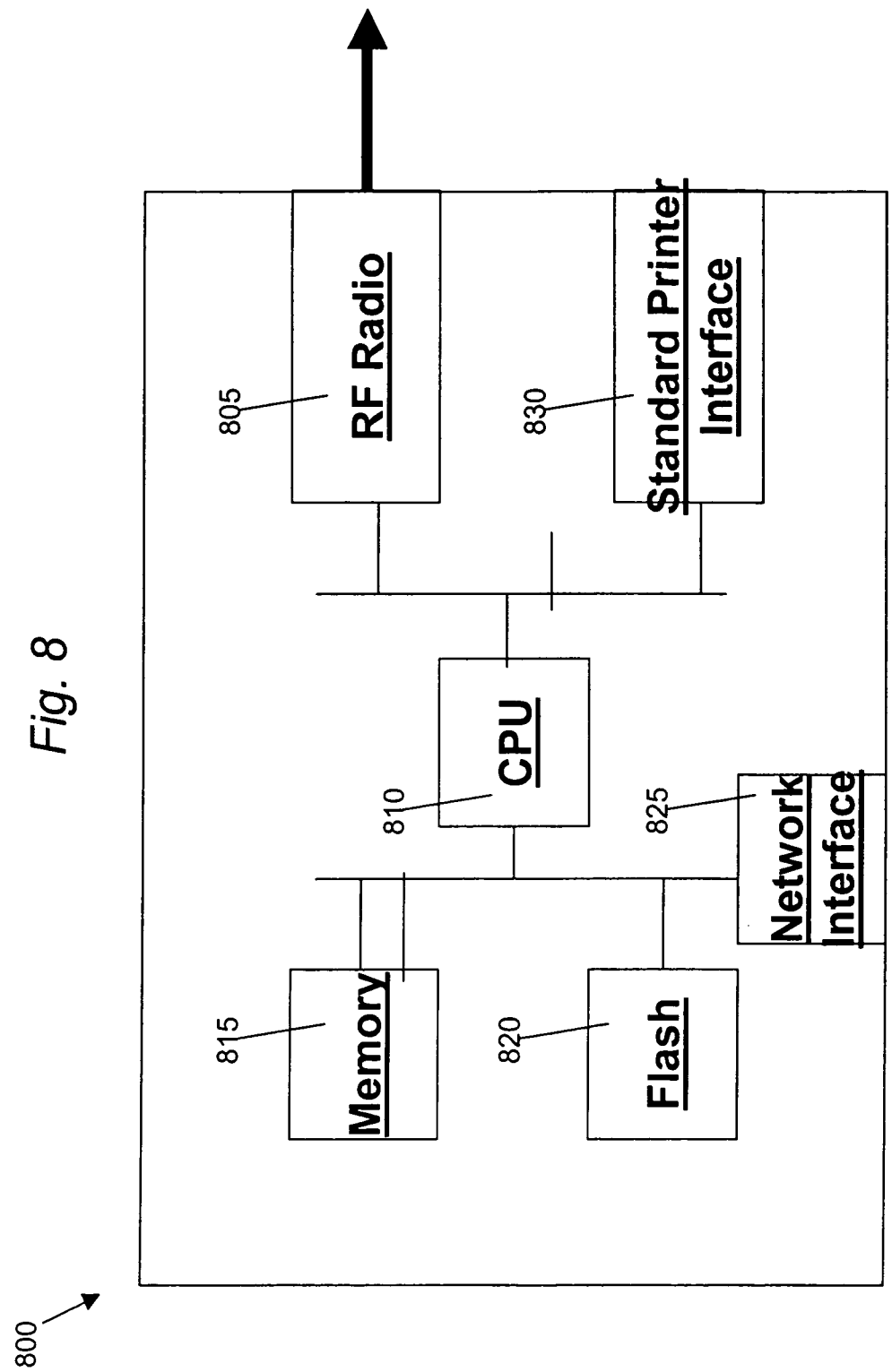
FIG. 8 is a block diagram of an exemplary RFID printer that may be configured to perform some methods of the present invention.

FIG. 8 is a block diagram illustrating an exemplary RFID printer 800 that may be configured to perform some methods of the present invention. RFID printer 800 has many of the same components as RFID reader 700 and can be configured in the same general manner as RFID reader 700.

RFID printer also includes printer interface 830, which may be a standard printer interface. Printer interface prints a label for each RFID tag, e.g. according to instructions received from network 200 via network interface 825.

RF Radio 805 is an outbound radio that is used to send RF signals to the antenna of an RFID tag under the control of CPU 810, thereby encoding information (e.g. an EPC) on the tag's microprocessor. Preferably, RF Radio 805 then checks the encoded information for accuracy. The RFID tag is sandwiched within the label produced by printer interface 830.

Figure 9:
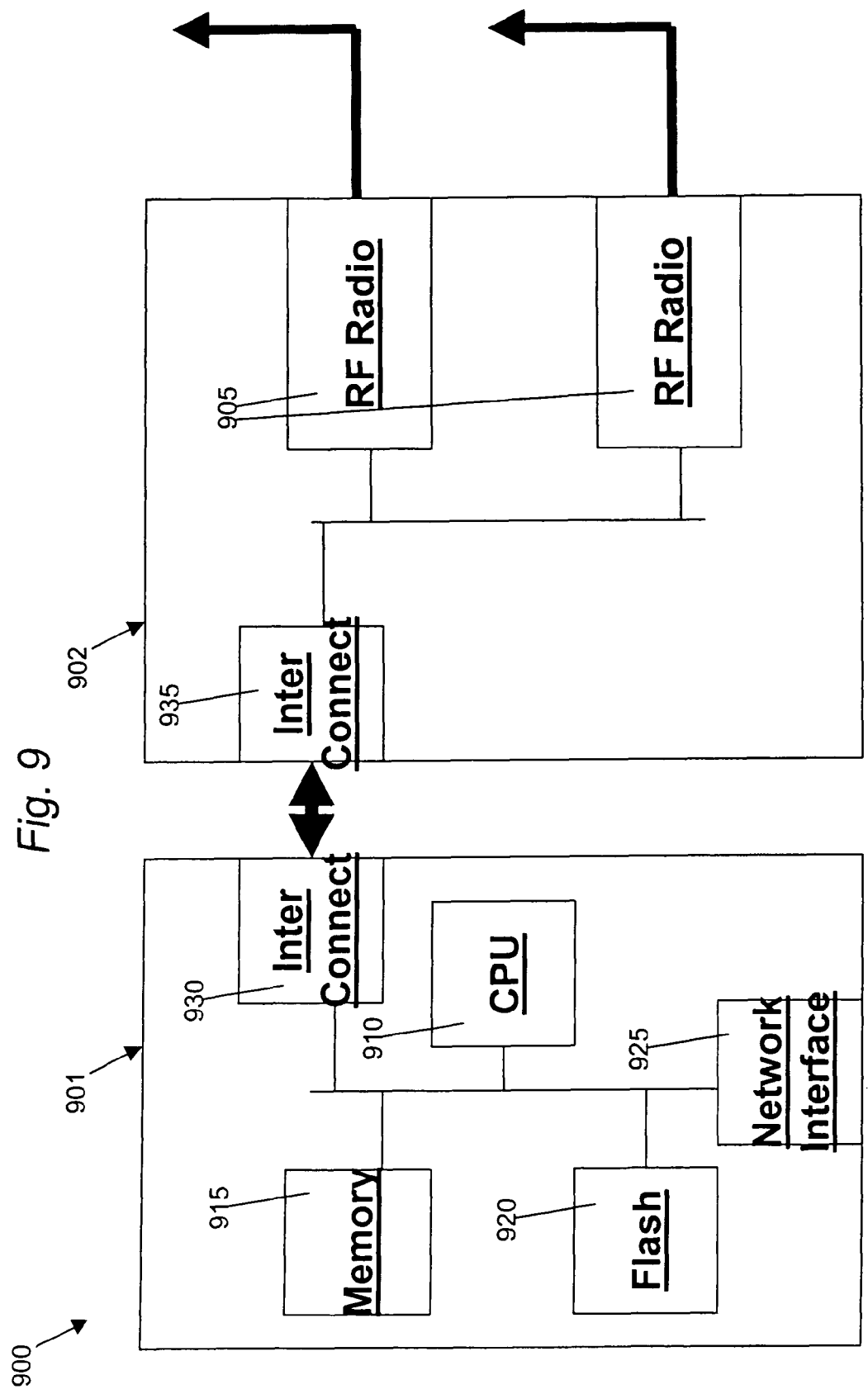
FIG. 9 is a block diagram of an exemplary RFID system that may be configured to perform some methods of the present invention.

FIG. 9 illustrates RFID system 900 that includes control portion 901 and RF radio portion 902. The components of control portion 901 are substantially similar to those described above with reference to FIGS. 7 and 8. Interconnect 930 of control portion 901 is configured for communication with interconnect 935 of RF radio portion 902. The communication may be via any convenient medium and format, such as wireless, serial, point-to-point serial, etc. Although only one RF radio portion 902 is depicted in FIG. 9, each control portion 901 may control a plurality of RF radio portions 902. RFID system 900 may be deployed on a single framework or chassis (e.g., on a forklift) or in multiple chassis.

Figure 10:
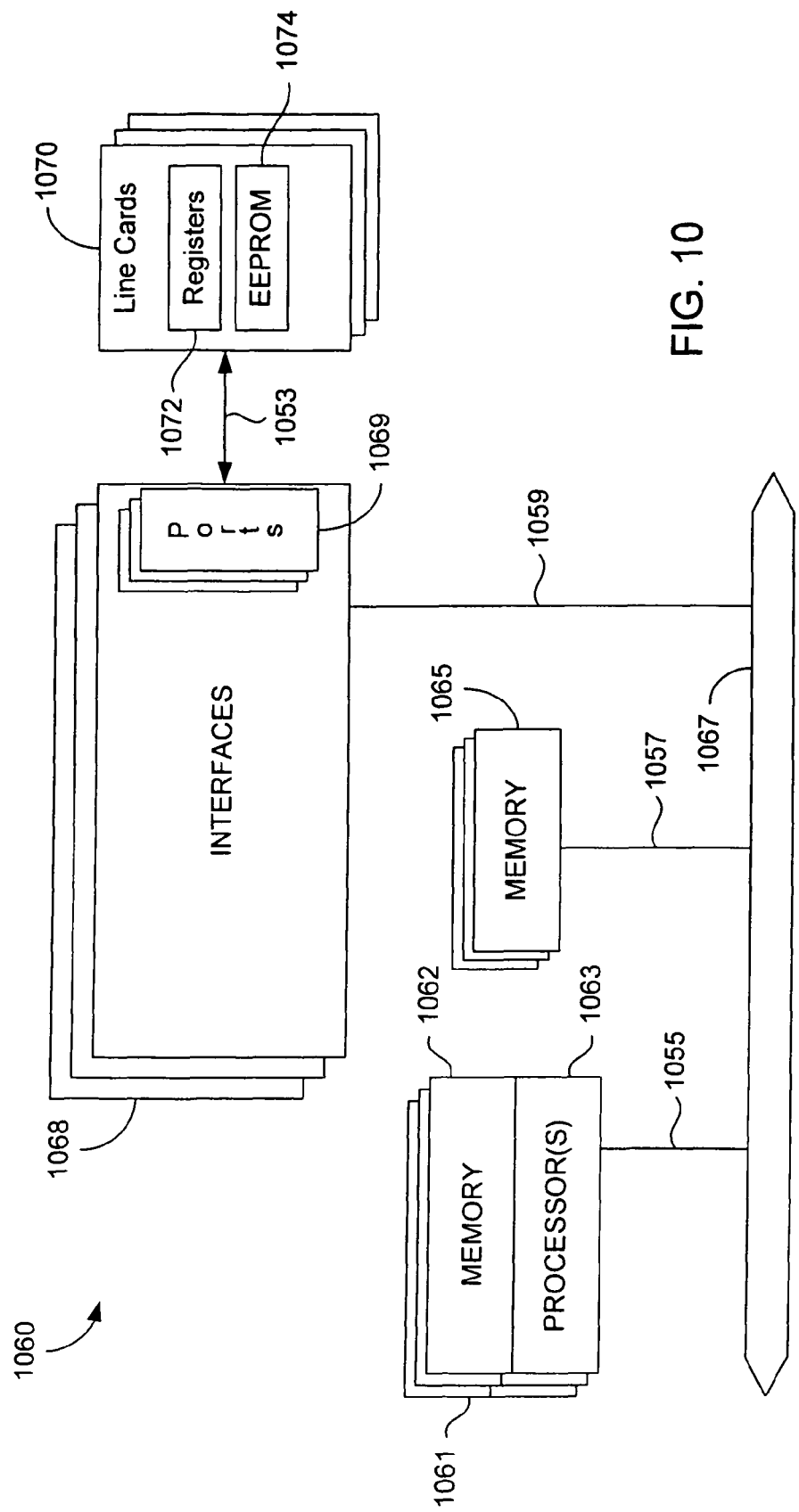
FIG. 10 illustrates an example of a network device that may be configured to implement some methods of the present invention.

FIG. 10 illustrates an example of a network device that may be configured to implement some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor 1074 and, in some instances, volatile RAM. Independent processors 1074 may be, for example ASICs or any other appropriate processors. According to some such embodiments, these independent processors 1074 perform at least some of the functions of the logic described herein. In some embodiments, one or more of interfaces 1068 control such communications-intensive tasks as media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "line cards"). Generally, interfaces 1068 control the sending and receiving of data packets over the network and sometimes support other peripherals used with the network device 1060. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system (e.g. Linux, VxWorks, etc.), and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 10) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application. For example, it will be appreciated by those of skill in the art that this document applies to monitoring the status of any relatively unsophisticated devices in a network, e.g., to monitoring networked sensing devices, devices in an industrial network, etc.

Accordingly, the present embodiments are to be considered as illustrative and not restrictive, and the invention is not to be limited to the details given herein, but may be modified within the scope and equivalents of the appended claims.

I claim:

1. A method of determining the status of a device, the method comprising:
   instructing by a network device each one of a plurality of radio frequency identification ("RFID") devices to set one or more triggers for transmitting a message and to transmit a message upon detection of the occurrence of at least one of the set of one or more triggers by the corresponding one of the plurality of RFID devices, wherein instructing is performed by sending a command to each of the plurality of RFID devices, wherein sending a command includes sending one or more command packets, wherein the command specifies the one or more triggers;
   receiving by the network device a message transmitted from each of one or more of the plurality of RFID devices, the message comprising an Electronic Product Code ("EPC") of a transmitting RFID device and a time stamp of the transmitting RFID device; and
   processing by the network device the messages according to a first rule set.

2. The method of claim 1, wherein the set of one or more triggers for transmitting a message comprises the passage of a predetermined time interval, thereby instructing each of the plurality of RFID devices to transmit a message upon the occurrence of the predetermined time interval until additional instructions are received.

3. The method of claim 1, wherein the set of one or more triggers comprises the passage of a first time interval.

4. The method of claim 1, wherein status information included in the message consists of device status change information of the transmitting RFID device.

5. The method of claim 1, wherein the message comprises a plurality of packets.

6. The method of claim 1, wherein each of the plurality of RFID devices is configured to transmit a message to one of a plurality of servers depending upon a second rule set.

7. The method of claim 1, wherein the processing step comprises:
   determining that a message indicates a potentially abnormal condition; and
   routing the message to a second destination for diagnosis of the potentially abnormal condition.

8. The method of claim 1, wherein a message comprises at least one of the following: information regarding utilization of the transmitting RFID device; information regarding a radio frequency interface of the transmitting RFID device; information specified by a vendor of the transmitting RFID device; information regarding a local area network that includes the transmitting RFID device; and information regarding Internet Protocol packet statistics.

9. The method of claim 1, wherein the message further comprises encrypted authentication information.

10. The method of claim 1, wherein the message is formatted in a manner consistent with the Simple Network Management Protocol.

11. The method of claim 3, wherein each of the plurality of RFID devices is configured with a time-based message throttle that sets a minimum time interval for message transmissions from the RFID device.

12. The method of claim 1, wherein the message is in one of a plurality of predetermined message formats, and wherein instructing includes specifying one of the plurality of predetermined message formats via which to transmit the message, wherein the message formats include a heartbeat format, a status message format, a partial statistics format and a full statistics format.

13. The method of claim 7, further comprising instructing the transmitting RFID device that transmitted the message to transmit subsequent messages to the second destination.

14. The method of claim 9, further comprising validating the message according to the authentication information.

15. A computer program embodied in a machine-readable medium, the computer program including instructions for controlling at least one device in a network to perform the following steps:
   instruct each one of a plurality of radio frequency identification ("RFID") devices to set one or more triggers for transmitting a message and to transmit a message upon detection by the one of the plurality of RFID devices of the occurrence of at least one of the one or more triggers such that the message is transmitted, wherein instructing is performed by sending a command to each of the plurality of RFID devices, wherein sending a command includes sending one or more command packets, wherein the command specifies the one or more triggers;
   receive a message transmitted from each of one or more of the plurality of RFID devices, the message comprising an Electronic Product Code ("EPC") of a transmitting RFID device and a time stamp of the transmitting RFID device; and process the messages according to a first rule set.

16. A radio frequency identification ("RFID") network, comprising:
a plurality of RFID devices;
a first server configured to receive messages transmitted from the RFID devices and for processing the messages according to a first rule set, each of the messages comprising an Electronic Product Code ("EPC") of a transmitting RFID device, a time stamp of the transmitting device, and device status change information of the transmitting RFID device; and
means for instructing each one of a plurality of RFID devices to set one or more triggers for transmitting a message and to transmit a message to a first server upon detection by the one of the plurality of RFID devices of the occurrence of at least one of the set of one or more triggers such that the message is transmitted, wherein instructing is performed by sending a command to each of the plurality of RFID devices, wherein sending a command includes sending one or more command packets, wherein the command specifies the one or more triggers.

17. The RFID network of claim 16, wherein the first server is further configured to determine whether a message indicates a potentially abnormal condition.

18. The RFID network of claim 17, further comprising a second server, wherein the first server is further configured to route a message indicating a potentially abnormal condition to the second server and wherein the second server is configured to evaluate potentially abnormal conditions according to a second rule set.

19. A network device, comprising:
a plurality of interfaces configured for communication with a plurality of radio frequency identification ("RFID") devices, each one of the plurality of RFID devices being configured to transmit a message upon detection by the one of the plurality of RFID devices of the occurrence of at least one of a corresponding set of one or more triggers, wherein each of the RFID devices has received the corresponding set of one or more triggers during provisioning of the RFID devices, the message comprising an Electronic Product Code ("EPC") of a transmitting RFID device, a time stamp provided by the transmitting RFID device, and device status change information associated with the transmitting RFID device, wherein the provisioning of the RFID devices is performed by sending a command to each of the plurality of RFID devices, wherein sending the command includes sending one or more command packets, wherein the command specifies the one or more triggers; and
at least one logic device configured to perform the following steps:
determine a message format of a message from an RFID device, the message format being one of a plurality of message formats;
parse the message according to the determined message format; and
determine whether the message includes sufficient information to determine a reason for the occurrence of the at least one of the corresponding set of one or more triggers.

20. The network device of claim 19, wherein the logic device is further configured to instruct the RFID device to provide additional information when the logic device determines that the message does not include sufficient information to determine a reason for the occurrence of the at least one of the corresponding set of one or more triggers.

21. The network device of claim 19, wherein the message is formatted in conformity with the Simple Network Management Protocol.

22. The network device of claim 20, wherein the logic device is further configured to instruct the RFID device to provide the additional information to another network device.

23. The method of claim 1, wherein the message is in one of a plurality of predetermined message formats, and wherein instructing includes specifying one of the plurality of predetermined message formats via which to transmit the message, wherein instructing each of a plurality of radio frequency identification ("RFID") devices to set one or more triggers for transmitting a message and to transmit a message upon the occurrence of at least one of the set of one or more triggers comprises:
instructing one of the plurality of RFID devices to transmit a message conforming to one of the plurality of predetermined message formats; and
instructing a second one of the plurality of RFID devices to transmit a message conforming to one of the plurality of predetermined message formats.

24. The method of claim 1, wherein instructing each of a plurality of radio frequency identification ("RFID") devices to set one or more triggers for transmitting a message and to transmit a message upon the occurrence of at least one of the set of one or more triggers comprises:
instructing one of the plurality of RFID devices to set one or more triggers including the passage of a first time interval; and
instructing a second one of the plurality of RFID devices to set one or more triggers including the passage of a second time interval.

25. The method of claim 1, wherein instructing each of a plurality of radio frequency identification ("RFID") devices to set one or more triggers for transmitting a message and to transmit a message upon the occurrence of at least one of the set of one or more triggers comprises:
instructing a first one of the plurality of RFID devices to transmit a message upon the occurrence of a first set of one or more triggers, wherein instructing includes specifying the first set of one or more triggers; and
instructing a second one of the plurality of RFID devices to transmit a message upon the occurrence of a second set of one or more triggers, wherein instructing includes specifying the second set of one or more triggers.

26. The method of claim 1, wherein the one or more triggers comprises a predetermined change of at least one criterion.

27. The method of claim 1, wherein a type of the message that is transmitted corresponds to a type of a corresponding one of the set of one or more triggers.

28. The method of claim 25, wherein the first set of one or more triggers includes a passage of a first time period, and wherein the second set of one or more triggers includes a passage of a second time period.

29. The method of claim 1, wherein instructing is performed by sending a command to each of the plurality of RFID devices during a provisioning or reprovisioning process.

30. The method of claim 1, wherein the message is in one of a plurality of predetermined message formats, and wherein instructing includes specifying one of the plurality of predetermined message formats via which to transmit the message.

31. The RFID network of claim 16, wherein the message is in one of a plurality of predetermined message formats, and wherein instructing includes specifying one of the plurality of predetermined message formats via which to transmit the message.

32. An apparatus for determining the status of a device, comprising:
- a processor; and
- a memory, at least one of the processor or the memory being configured for:
  - instructing by a network device each one of a plurality of radio frequency identification ("RFID") devices to set one or more triggers for transmitting a message and to transmit a message upon detection of the occurrence of at least one of the set of one or more triggers by the corresponding one of the plurality of RFID devices, wherein instructing is performed by sending a command to each of the plurality of RFID devices, wherein sending a command includes sending one or more command packets, wherein the one or more triggers are specified in the command;
  - receiving by the network device a message transmitted from each of one or more of the plurality of RFID devices, the message comprising an Electronic Product Code ("EPC") of a transmitting RFID device and a time stamp of the transmitting RFID device; and
  - processing by the network device the messages according to a first rule set.

* * * * *